US012561516B2

(12) United States Patent
Yamamoto et al.

(10) Patent No.: US 12,561,516 B2
(45) Date of Patent: Feb. 24, 2026

(54) SENTENCE MANAGEMENT SYSTEM AND STORAGE MEDIUM STORING SENTENCE MANAGEMENT PROGRAM

(71) Applicant: SEIKO EPSON CORPORATION, Tokyo (JP)

(72) Inventors: Takayuki Yamamoto, Matsumoto (JP); Kentaro Kanada, Ina (JP); Yuta Takahashi, Asahi-mura (JP); Masayuki Kawasaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 140 days.

(21) Appl. No.: 18/425,322

(22) Filed: Jan. 29, 2024

(65) Prior Publication Data

US 2024/0273283 A1 Aug. 15, 2024

(30) Foreign Application Priority Data

Jan. 31, 2023 (JP) ................................ 2023-012632

(51) Int. Cl.
*G06F 40/166* (2020.01)

(52) U.S. Cl.
CPC ................................. *G06F 40/166* (2020.01)

(58) Field of Classification Search
CPC .................................................... G06F 40/166
USPC ......................................................... 715/256
See application file for complete search history.

(56) References Cited

U.S. PATENT DOCUMENTS

| | | | | |
|---|---|---|---|---|
| 8,775,332 B1 * | 7/2014 | Morris | ..................... | G06N 5/02 |
| | | | | 706/11 |
| 11,308,258 B1 * | 4/2022 | Werner | ................. | G06F 40/194 |
| 12,217,480 B1 * | 2/2025 | Karpman | ............. | G06V 10/761 |
| 2005/0216857 A1 * | 9/2005 | Harako | ................... | G06F 9/451 |
| | | | | 715/792 |
| 2009/0316198 A1 * | 12/2009 | Takeuchi | ............. | H04L 67/535 |
| | | | | 358/1.15 |
| 2012/0271835 A1 * | 10/2012 | Gaude | ................ | G06F 16/9535 |
| | | | | 707/748 |

(Continued)

FOREIGN PATENT DOCUMENTS

| | | |
|---|---|---|
| JP | 2002251408 B | 1/2011 |
| JP | 2015525929 A | 9/2015 |

(Continued)

OTHER PUBLICATIONS

Copyperin (https://saku-tools.info/copyperin/?rd_code=1A).

(Continued)

*Primary Examiner* — Reza Nabi
(74) *Attorney, Agent, or Firm* — CHIP LAW GROUP

(57) ABSTRACT
A sentence management system includes an obtainer configured to obtain a sentence of interest and a plurality of comparison sentences, a distance calculator configured to calculate a sentence distance between the sentence of interest and each of the comparison sentences, and a display processor configured to cause the sentence of interest, the comparison sentences, and a list of comparison sentence names arranged in order of the sentence distance to be displayed simultaneously. The distance calculator is configured to calculate the sentence distance by calculating a number of edits on a per-word basis between the sentence of interest and each of the comparison sentences.

9 Claims, 19 Drawing Sheets

(56) References Cited

U.S. PATENT DOCUMENTS

| | | | | |
|---|---|---|---|---|
| 2015/0066475 A1* | 3/2015 | Azzam | | G06F 40/237 |
| | | | | 704/9 |
| 2015/0195220 A1* | 7/2015 | Hawker | | H04L 51/216 |
| | | | | 707/723 |
| 2016/0055145 A1* | 2/2016 | Chauhan | | G06Q 10/10 |
| | | | | 704/9 |
| 2016/0196342 A1* | 7/2016 | Kim | | G06F 40/247 |
| | | | | 707/728 |
| 2016/0307563 A1* | 10/2016 | Shrivastava | | G06F 16/951 |
| 2017/0060854 A1* | 3/2017 | Zeng | | G06F 40/30 |
| 2017/0148441 A1* | 5/2017 | Fujii | | G10L 15/1815 |
| 2017/0255686 A1* | 9/2017 | Ross | | G06F 16/26 |
| 2018/0247054 A1* | 8/2018 | Porat | | G06N 7/01 |
| 2019/0221204 A1* | 7/2019 | Zhang | | G06N 3/08 |
| 2020/0110882 A1* | 4/2020 | Ripolles Mateu | | G06F 16/353 |
| 2021/0209311 A1* | 7/2021 | Liu | | G06F 40/247 |
| 2021/0248624 A1* | 8/2021 | Keren | | G06Q 50/184 |
| 2021/0256045 A1* | 8/2021 | Jiao | | G06F 16/35 |
| 2021/0271870 A1* | 9/2021 | Ni | | G06N 3/096 |
| 2021/0374664 A1* | 12/2021 | Shahzad | | G06T 7/0004 |
| 2022/0207050 A1* | 6/2022 | Awadhwal | | G06Q 10/103 |
| 2022/0270589 A1* | 8/2022 | Ichimura | | G06F 40/295 |
| 2022/0309813 A1* | 9/2022 | Melchy | | G06V 30/413 |
| 2023/0343329 A1* | 10/2023 | Figov | | G10L 15/04 |
| 2024/0028827 A1* | 1/2024 | Park | | G06F 40/232 |
| 2024/0273283 A1* | 8/2024 | Yamamoto | | G06F 40/166 |
| 2024/0362404 A1* | 10/2024 | Raees | | G06F 40/166 |
| 2024/0386199 A1* | 11/2024 | Ghasemzadeh | | G06F 40/194 |
| 2024/0403563 A1* | 12/2024 | Bex, IV | | G06F 16/383 |
| 2025/0094690 A1* | 3/2025 | DeCharms | | G06N 20/00 |
| 2025/0307547 A1* | 10/2025 | Gaidylo | | G06F 40/253 |

FOREIGN PATENT DOCUMENTS

| | | | |
|---|---|---|---|
| JP | 2021086362 | A | 6/2021 |
| JP | 2020500371 | B | 6/2022 |
| JP | 2021131846 | B2 | 6/2022 |
| JP | 2022093215 | B | 6/2022 |
| WO | 2014011689 | A | 1/2014 |
| WO | 2018087190 | A1 | 5/2018 |

OTHER PUBLICATIONS

Grep (https://man7.org/linux/man-pages/man1/grep.1.html).
TortoiseGitMerge (https://tortoisegit.org/docs/tortoisegitmerge/tmerge-dug.html#tmerge-dug-dia-2pane).
WinMerge (https://manual.winmerge.org/en/Quick_start.html#QuickStart_comparingfiles).

* cited by examiner

|  | | I | feel | very | happy | today | It | is | fine | Sky | and | sea | live | Because | wind | run | fast |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| It | 1 | 1 | 2 | 3 | 4 | 5 | 5 | 6 | 7 | 8 | 9 | 10 | 11 | 12 | 13 | 14 | 15 |
| is | 2 | 2 | 2 | 3 | 4 | 5 | 6 | 5 | 6 | 7 | 8 | 9 | 10 | 11 | 12 | 13 | 14 |
| fine | 3 | 3 | 3 | 3 | 4 | 5 | 6 | 6 | 5 | 6 | 7 | 8 | 9 | 10 | 11 | 12 | 13 |
| today | 4 | 4 | 4 | 4 | 4 | 4 | 5 | 6 | 6 | 6 | 7 | 8 | 9 | 10 | 11 | 12 | 13 |
| and | 5 | 5 | 5 | 5 | 5 | 5 | 5 | 6 | 7 | 7 | 6 | 7 | 8 | 9 | 10 | 11 | 12 |
| I | 6 | 5 | 6 | 6 | 6 | 6 | 6 | 6 | 7 | 8 | 7 | 7 | 8 | 9 | 10 | 11 | 12 |
| feeel | 7 | 6 | 6 | 7 | 7 | 7 | 7 | 7 | 7 | 8 | 8 | 8 | 8 | 9 | 10 | 11 | 12 |
| very | 8 | 7 | 7 | 6 | 7 | 8 | 8 | 8 | 8 | 8 | 9 | 9 | 9 | 9 | 10 | 11 | 12 |
| hapy | 9 | 8 | 8 | 7 | 7 | 8 | 9 | 9 | 9 | 9 | 9 | 10 | 10 | 10 | 10 | 11 | 12 |
| Sky | 10 | 9 | 9 | 8 | 8 | 8 | 9 | 10 | 10 | 9 | 10 | 10 | 11 | 11 | 11 | 11 | 12 |
| and | 11 | 10 | 10 | 9 | 9 | 9 | 9 | 10 | 11 | 10 | 9 | 10 | 11 | 12 | 12 | 12 | 12 |
| wind | 12 | 11 | 11 | 10 | 10 | 10 | 10 | 10 | 11 | 11 | 10 | 10 | 11 | 12 | 12 | 13 | 13 |
| run | 13 | 12 | 12 | 11 | 11 | 11 | 11 | 11 | 11 | 12 | 11 | 11 | 11 | 12 | 13 | 12 | 13 |
| fast | 14 | 13 | 13 | 12 | 12 | 12 | 12 | 12 | 12 | 12 | 12 | 12 | 12 | 12 | 13 | 13 | 12 |
| because | 15 | 14 | 14 | 13 | 13 | 13 | 13 | 13 | 13 | 13 | 13 | 13 | 13 | 12 | 13 | 14 | 13 |
| sea | 16 | 15 | 15 | 14 | 14 | 14 | 14 | 14 | 14 | 14 | 14 | 13 | 14 | 13 | 13 | 14 | 14 |
| live | 17 | 16 | 16 | 15 | 15 | 15 | 15 | 15 | 15 | 15 | 15 | 14 | 13 | 14 | 14 | 14 | 15 | y ↓

| B[y] \ A[x] | | I | feel | very | happy | today | It | is | fine | Sky | and | sea | live | because | wind | run | fast |
|---|---|---|---|---|---|---|---|---|---|---|---|---|---|---|---|---|---|
| | 0 | 1 | 2 | 3 | 4 | 5 | | | | | | | | | | | |
| It | 1 | 1 | 2 | | | | 5 | | | | | | | | | | |
| is | | 2 | 2 | 3 | | | | 5 | | | | | | | | | |
| fine | | | 3 | 3 | 4 | | | | 5 | | | | | | | | |
| today | | | | 4 | 4 | 4 | 5 | | | | 6 | | | | | | |
| and | | | | | 5 | 5 | 5 | 6 | | | 6 | | | | | | |
| I | | | | | | 6 | 6 | 6 | 7 | | | 7 | | | | | |
| feeel | | | | | | | 7 | 7 | 7 | 8 | 8 | 8 | 8 | | | | |
| very | | | | | | | | 8 | 8 | 8 | 9 | 9 | 9 | 9 | | | |
| hapy | | | | | | | | | 9 | | 9 | 10 | 10 | 10 | | | |
| Sky | | | | | | | | | | 9 | | 10 | 11 | 11 | | | |
| and | | | | | | | | | | | 9 | 10 | 11 | 12 | | | |
| wind | | | | | | | | | | | | 10 | 10 | | 12 | | |
| run | | | | | | | | | | | | 11 | 11 | | | 12 | |
| fast | | | | | | | | | | | | 12 | 12 | | | | 12 |
| because | | | | | | | | | | | 12 | 13 | | | | | 13 |
| sea | | | | | | | | | | | | | 13 | | | 14 | 14 |
| live | | | | | | | | | | | | | | | | 14 | 15 |

| ELEMENT CATEGORY | CHARACTER COLOR | BACKGROUND COLOR |
|---|---|---|
| SYMBOL REMOVED DURING COMPARISON | GRAY | WHITE |
| CORRESPONDING WORD IS FOUND | BLACK | WHITE |
| OTHER WORD | RED | SALMON |
| WHITE SPACE BETWEEN WORDS | BLACK, OR IF ELEMENTS BEFORE AND AFTER WHITE SPACE ARE SAME IN CATEGORY, COLOR OF WHITE SPACE IS SET TO COLOR OF CATEGORY | WHITE, OR IF ELEMENTS BEFORE AND AFTER WHITE SPACE ARE SAME IN CATEGORY, COLOR OF WHITE SPACE IS SET TO COLOR OF CATEGORY |

| B[y] | | I | feel | very | happy | today | It | is | fine | Sky | and | sea | live | because | wind | run | fast |
|---|---|---|---|---|---|---|---|---|---|---|---|---|---|---|---|---|---|
| | 0.0 | 0.6 | 1.3 | 2.0 | 2.6 | 3.3 | 4.0 | 4.6 | 5.3 | 6.0 | 6.6 | 7.3 | 8.0 | 8.6 | 9.3 | 10.0 | 10.6 |
| It | 0.6 | 1.0 | 1.6 | 2.3 | 3.0 | 3.6 | 3.3 | 4.0 | 4.6 | 5.3 | 6.0 | 6.6 | 7.3 | 8.0 | 8.6 | 9.3 | 10.0 |
| is | 1.3 | 1.6 | 2.0 | 2.6 | 3.3 | 4.0 | 4.0 | 3.3 | 4.0 | 4.6 | 5.3 | 6.0 | 6.6 | 7.3 | 8.0 | 8.6 | 9.3 |
| fine | 2.0 | 2.3 | 2.6 | 3.0 | 3.6 | 4.3 | 4.6 | 4.0 | 3.3 | 4.0 | 4.6 | 5.3 | 6.0 | 6.6 | 7.3 | 8.0 | 8.6 |
| today | 2.6 | 3.0 | 3.3 | 3.6 | 4.0 | 3.6 | 4.3 | 4.6 | 4.0 | 4.3 | 5.0 | 5.6 | 6.3 | 7.0 | 7.6 | 8.3 | 9.0 |
| and | 3.3 | 3.6 | 4.0 | 4.3 | 4.6 | 4.3 | 4.6 | 5.3 | 4.6 | 5.0 | 4.3 | 5.0 | 5.6 | 6.3 | 7.0 | 7.6 | 8.3 |
| I | 4.0 | 3.3 | 4.0 | 4.6 | 5.3 | 5.0 | 5.3 | 5.6 | 5.3 | 5.6 | 5.0 | 5.3 | 6.0 | 6.6 | 7.3 | 8.0 | 8.6 |
| feeel | 4.6 | 4.0 | 4.3 | 5.0 | 5.6 | 5.6 | 6.0 | 6.3 | 6.0 | 6.3 | 5.6 | 6.0 | 6.3 | 7.0 | 7.6 | 8.3 | 9.0 |
| very | 5.3 | 4.6 | 5.0 | 4.3 | 5.0 | 5.6 | 6.3 | 7.0 | 6.6 | 7.0 | 6.3 | 6.6 | 7.0 | 7.3 | 8.0 | 8.6 | 9.3 |
| hapy | 6.0 | 5.3 | 5.6 | 5.0 | 5.3 | 6.0 | 6.6 | 7.3 | 7.3 | 7.6 | 7.0 | 7.3 | 7.6 | 8.0 | 8.3 | 9.0 | 9.6 |
| Sky | 6.6 | 6.0 | 6.3 | 5.6 | 6.0 | 6.3 | 7.0 | 7.6 | 8.0 | 7.3 | 7.6 | 8.0 | 8.3 | 8.6 | 9.0 | 9.3 | 10.0 |
| and | 7.3 | 6.6 | 7.0 | 6.3 | 6.6 | 7.0 | 7.3 | 8.0 | 8.6 | 8.0 | 7.3 | 8.0 | 8.6 | 9.3 | 9.6 | 10.0 | 10.3 |
| wind | 8.0 | 7.3 | 7.6 | 7.0 | 7.3 | 7.6 | 8.0 | 8.3 | 9.0 | 8.6 | 8.0 | 8.3 | 9.0 | 9.6 | 9.3 | 10.0 | 10.6 |
| run | 8.6 | 8.0 | 8.3 | 7.6 | 8.0 | 8.3 | 8.6 | 9.0 | 9.3 | 9.3 | 8.6 | 9.0 | 9.3 | 10.0 | 10.0 | 9.3 | 10.0 |
| fast | 9.3 | 8.6 | 9.0 | 8.3 | 8.6 | 9.0 | 9.3 | 9.6 | 10.0 | 10.0 | 9.3 | 9.6 | 10.0 | 10.3 | 10.6 | 10.0 | 9.3 |
| because | 10.0 | 9.3 | 9.6 | 9.0 | 9.3 | 9.6 | 10.0 | 10.3 | 10.6 | 10.6 | 10.0 | 10.3 | 10.6 | 10.0 | 10.6 | 10.6 | 10.0 |
| sea | 10.6 | 10.0 | 10.3 | 9.6 | 10.0 | 10.3 | 10.6 | 11.0 | 11.3 | 11.3 | 10.6 | 10.0 | 10.6 | 10.6 | 11.0 | 11.3 | 10.6 |
| live | 11.3 | 10.6 | 11.0 | 10.3 | 10.6 | 11.0 | 11.3 | 11.6 | 12.0 | 12.0 | 11.3 | 10.6 | 10.0 | 10.6 | 11.3 | 12.0 | 11.3 |

| | | I | feel | very | happy | today | It | is | fine | Sky | and | sea | live | because | wind | run | fast |
|---|---|---|---|---|---|---|---|---|---|---|---|---|---|---|---|---|---|
| | 0.0 | 0.6 | 1.3 | 2.0 | 2.6 | 3.3 | | | | | | | | | | | |
| It | | | | | | | 3.3 | | | | | | | | | | |
| is | | | | | | | | 3.3 | | | | | | | | | |
| fine | | | | | | | | | 3.3 | | | | | | | | |
| today | | | | | | | | | 4.0 | 4.3 | | | | | | | |
| and | | | | | | | | | 4.6 | | 4.3 | | | | | | |
| I | | | | | | | | | 5.3 | | 5.0 | 5.3 | | | | | |
| feeel | | | | | | | | | 6.0 | | 5.6 | 6.0 | 6.3 | | | | |
| very | | | | | | | | | 6.6 | | 6.3 | 6.6 | 7.0 | 7.3 | | | |
| hapy | | | | | | | | | 7.3 | | | | 7.3 | 7.6 | 8.0 | | |
| Sky | | | | | | | | | | 7.3 | | | | 8.3 | 8.6 | | |
| and | | | | | | | | | | | 7.3 | 8.0 | 8.6 | 9.3 | | | |
| wind | | | | | | | | | | | | | | | 9.3 | | |
| run | | | | | | | | | | | | | | | | 9.3 | |
| fast | | | | | | | | | | | | | | | | | 9.3 |
| because | | | | | | | | | | | | | | | | | 10.0 |
| sea | | | | | | | | | | | | | | | | | 10.6 |
| live | | | | | | | | | | | | | | | | | 11.3 | y ↓

| | | I | feel | very | happy | today | It | is | fine | Sky | and | sea | live | because | wind | run | fast |
|---|---|---|---|---|---|---|---|---|---|---|---|---|---|---|---|---|---|
| | | 0.0 | 0.8 | 1.7 | 2.6 | 3.5 | 4.3 | 5.2 | 6.1 | 7.0 | 7.8 | 8.7 | 9.6 | 10.5 | 11.3 | 12.2 | 13.1 | 14.0 |
| It | | 0.8 | 1.0 | 1.8 | 2.7 | 3.6 | 4.5 | 4.3 | 5.2 | 6.1 | 7.0 | 7.8 | 8.7 | 9.6 | 10.5 | 11.3 | 12.2 | 13.1 |
| is | | 1.7 | 1.8 | 2.0 | 2.8 | 3.7 | 4.6 | 5.2 | 4.3 | 5.2 | 6.1 | 7.0 | 7.8 | 8.7 | 9.6 | 10.5 | 11.3 | 12.2 |
| fine | | 2.6 | 2.7 | 2.8 | 3.0 | 3.8 | 4.7 | 5.6 | 5.2 | 4.3 | 5.2 | 6.1 | 7.0 | 7.8 | 8.7 | 9.6 | 10.5 | 11.3 |
| today | | 3.5 | 3.6 | 3.7 | 3.8 | 4.0 | 3.8 | 4.7 | 5.6 | 5.2 | 5.3 | 6.2 | 7.1 | 8.0 | 8.8 | 9.7 | 10.6 | 11.5 |
| and | | 4.3 | 4.5 | 4.6 | 4.7 | 4.8 | 4.7 | 4.8 | 5.7 | 6.1 | 6.2 | 5.3 | 6.2 | 7.1 | 8.0 | 8.8 | 9.7 | 10.6 |
| I | | 5.2 | 4.3 | 5.2 | 5.6 | 5.7 | 5.6 | 5.7 | 5.8 | 6.7 | 7.1 | 6.2 | 6.3 | 7.2 | 8.1 | 9.0 | 9.8 | 10.7 |
| feeel | | 6.1 | 5.2 | 5.3 | 6.2 | 6.6 | 6.5 | 6.6 | 6.7 | 6.8 | 7.7 | 7.1 | 7.2 | 7.3 | 8.2 | 9.1 | 10.0 | 10.8 |
| very | | 7.0 | 6.1 | 6.2 | 5.3 | 6.2 | 7.1 | 7.5 | 7.6 | 7.7 | 7.8 | 8.0 | 8.1 | 8.2 | 8.3 | 9.2 | 10.1 | 11.0 |
| hapy | | 7.8 | 7.0 | 7.1 | 6.2 | 6.3 | 7.2 | 8.1 | 8.5 | 8.6 | 8.7 | 8.8 | 9.0 | 9.1 | 9.2 | 9.3 | 10.2 | 11.1 |
| Sky | | 8.7 | 7.8 | 8.0 | 7.1 | 7.2 | 7.3 | 8.2 | 9.1 | 9.5 | 8.6 | 9.5 | 9.8 | 10.0 | 10.1 | 10.2 | 10.3 | 11.2 |
| and | | 9.6 | 8.7 | 8.8 | 8.0 | 8.1 | 8.2 | 8.3 | 9.2 | 10.1 | 9.5 | 8.6 | 9.5 | 10.3 | 11.0 | 11.1 | 11.2 | 11.3 |
| wind | | 10.5 | 9.6 | 9.7 | 8.8 | 9.0 | 9.1 | 9.2 | 9.3 | 10.2 | 10.3 | 9.5 | 9.6 | 10.5 | 11.3 | 11.0 | 11.8 | 12.2 |
| run | | 11.3 | 10.5 | 10.6 | 9.7 | 9.8 | 10.0 | 10.1 | 10.2 | 10.3 | 11.2 | 10.3 | 10.5 | 10.6 | 11.5 | 11.8 | 11.0 | 11.8 |
| fast | | 12.2 | 11.3 | 11.5 | 10.6 | 10.7 | 10.8 | 11.0 | 11.1 | 11.2 | 11.3 | 11.2 | 11.3 | 11.5 | 11.6 | 12.5 | 11.8 | 11.0 |
| because | | 13.1 | 12.2 | 12.3 | 11.5 | 11.6 | 11.7 | 11.8 | 12.0 | 12.1 | 12.2 | 12.1 | 12.2 | 12.3 | 11.5 | 12.3 | 12.7 | 11.8 |
| sea | | 14.0 | 13.1 | 13.2 | 12.3 | 12.5 | 12.6 | 12.7 | 12.8 | 13.0 | 13.1 | 13.0 | 12.1 | 13.0 | 12.3 | 12.5 | 13.3 | 12.7 |
| live | | 14.8 | 14.0 | 14.1 | 13.2 | 13.3 | 13.5 | 13.6 | 13.7 | 13.8 | 14.0 | 13.8 | 13.0 | 12.1 | 13.0 | 13.3 | 13.5 | 13.6 |

| B[y] | | I | feel | very | happy | today | It | is | fine | Sky | and | sea | live | because | wind | run | fast |
|---|---|---|---|---|---|---|---|---|---|---|---|---|---|---|---|---|---|
| | 0.0 | 0.8 | 1.7 | 2.6 | 3.5 | 4.3 | | | | | | | | | | | |
| It | | | | | | | 4.3 | | | | | | | | | | |
| is | | | | | | | | 4.3 | | | | | | | | | |
| fine | | | | | | | | | 4.3 | | | | | | | | |
| today | | | | | | | | | | 5.3 | | | | | | | |
| and | | | | | | | | | | | 5.3 | | | | | | |
| I | | | | | | | | | | | 6.2 | 6.3 | | | | | |
| feeel | | | | | | | | | | | 7.1 | 7.2 | 7.3 | | | | |
| very | | | | | | | | | | | 8.0 | 8.1 | 8.2 | 8.3 | | | |
| hapy | | | | | | | | | | | | 9.0 | 9.1 | 9.2 | | | |
| Sky | | | | | | | | | | | | | 10.0 | 10.1 | | | |
| and | | | | | | | | | | | | | | 11.0 | | | |
| wind | | | | | | | | | | | | | | | 11.0 | | |
| run | | | | | | | | | | | | | | | | 11.0 | |
| fast | | | | | | | | | | | | | | | | | 11.0 |
| because | | | | | | | | | | | | | | | | | 11.8 |
| sea | | | | | | | | | | | | | | | | | 12.7 |
| live | | | | | | | | | | | | | | | | | 13.6 |

| | | I | feel | very | happy | today | It | is | fine | Sky | and | sea | live | because | wind | run | fast |
|---|---|---|---|---|---|---|---|---|---|---|---|---|---|---|---|---|---|
| | 0.0 | 0.8 | 1.7 | 2.6 | 3.5 | 4.3 | 5.2 | 6.1 | 7.0 | 7.8 | 8.7 | 9.6 | 10.5 | 11.3 | 12.2 | 13.1 | 14.8 |
| It | 0.8 | 1.0 | 1.8 | 2.7 | 3.6 | 4.5 | 4.3 | 5.2 | 6.1 | 7.0 | 7.8 | 8.7 | 9.6 | 10.5 | 11.3 | 12.2 | 13.1 |
| is | 1.7 | 1.8 | 2.0 | 2.8 | 3.7 | 4.6 | 5.2 | 4.3 | 5.2 | 6.1 | 7.0 | 7.8 | 8.7 | 9.6 | 10.5 | 11.3 | 12.1 |
| fine | 2.6 | 2.7 | 2.8 | 3.0 | 3.8 | 4.7 | 5.6 | 5.2 | 4.3 | 5.2 | 6.1 | 7.0 | 7.8 | 8.7 | 9.6 | 10.5 | 11.3 |
| today | 3.5 | 3.6 | 3.7 | 3.8 | 4.0 | 3.8 | 4.7 | 5.6 | 5.2 | 5.3 | 6.2 | 7.1 | 8.0 | 8.8 | 9.7 | 10.6 | 11.5 |
| and | 4.3 | 4.5 | 4.6 | 4.7 | 4.8 | 4.7 | 4.8 | 5.7 | 6.1 | 6.2 | 5.3 | 6.2 | 7.1 | 8.0 | 8.8 | 9.7 | 10.6 |
| I | 5.2 | 4.3 | 5.2 | 5.6 | 5.7 | 5.6 | 5.7 | 5.8 | 6.7 | 7.1 | 6.2 | 6.3 | 7.2 | 8.1 | 9.0 | 9.8 | 10.7 |
| feeel | 6.1 | 5.2 | 4.6 | 5.5 | 6.3 | 6.5 | 6.6 | 6.7 | 6.8 | 7.7 | 7.1 | 7.2 | 7.3 | 8.2 | 9.1 | 10.0 | 10.8 |
| very | 7.0 | 6.1 | 5.5 | 4.6 | 5.5 | 6.3 | 7.2 | 7.6 | 7.7 | 7.8 | 8.0 | 8.1 | 8.2 | 8.3 | 9.2 | 10.1 | 11.0 |
| hapy | 7.8 | 7.0 | 6.3 | 5.5 | 4.8 | 5.7 | 6.6 | 7.5 | 8.3 | 8.7 | 8.8 | 9.0 | 9.1 | 9.2 | 9.3 | 10.2 | 11.1 |
| Sky | 8.7 | 7.8 | 7.2 | 6.3 | 5.7 | 5.8 | 6.7 | 7.6 | 8.5 | 8.3 | 9.2 | 9.8 | 10.0 | 10.1 | 10.2 | 10.3 | 11.2 |
| and | 9.6 | 8.7 | 8.1 | 7.2 | 6.6 | 6.7 | 6.8 | 7.7 | 8.6 | 9.2 | 8.3 | 9.2 | 10.1 | 11.0 | 11.1 | 11.2 | 11.3 |
| wind | 10.5 | 9.6 | 9.0 | 8.1 | 7.5 | 7.6 | 7.7 | 7.8 | 8.7 | 9.6 | 9.2 | 9.3 | 10.2 | 11.1 | 11.0 | 11.8 | 12.2 |
| run | 11.3 | 10.5 | 9.8 | 9.0 | 8.3 | 8.5 | 8.6 | 8.7 | 8.8 | 9.7 | 10.1 | 10.2 | 10.3 | 11.2 | 11.8 | 11.0 | 11.8 |
| fast | 12.2 | 11.3 | 10.7 | 9.8 | 9.2 | 9.3 | 9.5 | 9.6 | 9.7 | 9.8 | 10.7 | 11.1 | 11.2 | 11.3 | 12.2 | 11.8 | 11.0 |
| because | 13.1 | 12.2 | 11.6 | 10.7 | 10.1 | 10.2 | 10.3 | 10.5 | 10.6 | 10.7 | 10.8 | 11.7 | 12.1 | 11.2 | 12.1 | 12.7 | 11.8 |
| sea | 14.0 | 13.1 | 12.5 | 11.6 | 11.0 | 11.1 | 11.2 | 11.3 | 11.5 | 11.6 | 11.7 | 10.8 | 11.7 | 12.1 | 12.2 | 13.1 | 12.7 |
| live | 14.8 | 14.0 | 13.3 | 12.5 | 11.8 | 12.0 | 12.1 | 12.2 | 12.3 | 12.5 | 12.6 | 11.7 | 10.8 | 11.7 | 12.6 | 13.2 | 13.6 |

| B[y] | | I | feel | very | happy | today | It | is | fine | Sky | and | sea | live | because | wind | run | fast |
|---|---|---|---|---|---|---|---|---|---|---|---|---|---|---|---|---|---|
| | 0.0 | 0.8 | 1.7 | 2.6 | 3.5 | 4.3 | | | | | | | | | | | |
| It | 0.8 | | | | | | 4.3 | | | | | | | | | | |
| is | 1.7 | | | | | | | 4.3 | | | | | | | | | |
| fine | 2.6 | | | | | | | | 4.3 | | | | | | | | |
| today | 3.5 | | | | | | | | | 5.3 | | | | | | | |
| and | 4.3 | | | | | | | | | | 5.3 | | | | | | |
| I | | 4.3 | | | | | | | | | 6.2 | 6.3 | | | | | |
| feeel | | | 4.6 | | | | | | | | 7.1 | 7.2 | 7.3 | | | | |
| very | | | | 4.6 | | | | | | | 8.0 | 8.1 | 8.2 | 8.3 | | | |
| hapy | | | | | 4.8 | 5.7 | 6.6 | 7.5 | 8.3 | | | 9.0 | 9.1 | 9.2 | | | |
| Sky | | | | | | | | | | 8.3 | | | 10.0 | 10.1 | | | |
| and | | | | | | | | | | | 8.3 | 9.2 | 10.1 | 11.0 | | | |
| wind | | | | | | | | | | | | | | | 11.0 | | |
| run | | | | | | | | | | | | | | | | 11.0 | |
| fast | | | | | | | | | | | | | | | | | 11.0 |
| because | | | | | | | | | | | | | | | | | 11.8 |
| sea | | | | | | | | | | | | | | | | | 12.7 |
| live | | | | | | | | | | | | | | | | | 13.6 |

| Name | Match |
|---|---|
| LICENSE A | 70% |
| LICENSE B | 50% |
| LICENSE C | 40% |
| ............ | |

RA   RB   RC

|  | LICENSE A | LICENSE B | LICENSE C | LICENSE D | LICENSE E | LICENSE F | LICENSE G | LICENSE H | LICENSE I | LICENSE J | LICENSE K | LICENSE L | LICENSE M |
|---|---|---|---|---|---|---|---|---|---|---|---|---|---|
| LICENSE A | 0 | 1431 | 1464 | 1533 | 1528 | 2677 | 5222 | 1540 | 3810 | 4003 | 1434 | 1535 | 1531 |
| LICENSE B | 1431 | 0 | 1149 | 928 | 922 | 2706 | 5327 | 929 | 3876 | 4065 | 1107 | 932 | 925 |
| LICENSE C | 1464 | 1149 | 0 | 1298 | 1294 | 2650 | 5196 | 1312 | 3768 | 3957 | 1243 | 1305 | 1302 |
| LICENSE D | 1533 | 928 | 1298 | 0 | 30 | 2844 | 5532 | 174 | 4052 | 4248 | 1176 | 168 | 176 |
| LICENSE E | 1528 | 922 | 1294 | 30 | 0 | 2842 | 5527 | 184 | 4050 | 4246 | 1171 | 184 | 184 |
| LICENSE F | 2677 | 2706 | 2650 | 2844 | 2842 | 0 | 4266 | 2863 | 2031 | 2278 | 2601 | 2857 | 2852 |
| LICENSE G | 5222 | 5327 | 5196 | 5532 | 5527 | 4266 | 0 | 5550 | 4449 | 4515 | 5117 | 5546 | 5538 |
| LICENSE H | 1540 | 929 | 1312 | 174 | 184 | 2863 | 5550 | 0 | 4075 | 4272 | 1179 | 146 | 150 |
| LICENSE I | 3810 | 3876 | 3768 | 4052 | 4050 | 2031 | 4449 | 4075 | 0 | 606 | 3638 | 4065 | 4060 |
| LICENSE J | 4003 | 4065 | 3957 | 4248 | 4246 | 2278 | 4515 | 4272 | 606 | 0 | 3781 | 4259 | 4253 |
| LICENSE K | 1434 | 1107 | 1243 | 1176 | 1171 | 2601 | 5117 | 1179 | 3638 | 3781 | 0 | 1181 | 1177 |
| LICENSE L | 1535 | 932 | 1305 | 168 | 184 | 2857 | 5546 | 146 | 4065 | 4259 | 1181 | 0 | 27 |
| LICENSE M | 1531 | 925 | 1302 | 176 | 184 | 2852 | 5538 | 150 | 4060 | 4253 | 1177 | 27 | 0 |

LICENSE BEING EXAMINED

DISTANCE: 174 − 54 TO 174 + 54

DISTANCE: 54

LICENSE H    DISTANCE: 174    LICENSE D

FIG. 20

| LICENSE NAME | NUMBER OF WORDS | RANGE OF LEVENSHTEIN DISTANCES TO LICENSE BEING EXAMINED | RANGE OF SIMILARITIES TO LICENSE BEING EXAMINED |
|---|---|---|---|
| LICENSE A | 1589 | 1479 TO 1587 | 0.1% TO 6.9% |
| LICENSE B | 970 | 874 TO 982 | -1.2% TO 9.9% |
| LICENSE C | 1364 | 1244 TO 1352 | 0.9% TO 8.8% |
| LICENSE D | 214 | 54 | 79.2% |
| LICENSE E | 231 | 24 TO 84 | 67.6% TO 90.7% |
| LICENSE F | 2947 | 2790 TO 2898 | 1.7% TO 5.3% |
| LICENSE G | 5640 | 5478 TO 5586 | 1.0% TO 2.9% |
| LICENSE H | 175 | 120 TO 228 | 12.0% TO 53.7% |
| LICENSE I | 4160 | 3998 TO 4106 | 1.3% TO 3.9% |
| LICENSE J | 4356 | 4194 TO 4302 | 1.2% TO 3.7% |
| LICENSE K | 1218 | 1122 TO 1230 | -1.0% TO 7.9% |
| LICENSE L | 163 | 114 TO 222 | 14.3% TO 56.0% |
| LICENSE M | 180 | 122 TO 230 | 11.2% TO 52.9% |

SENTENCE MANAGEMENT SYSTEM AND STORAGE MEDIUM STORING SENTENCE MANAGEMENT PROGRAM

The present application is based on, and claims priority from JP Application Serial Number 2023-012632, filed Jan. 31, 2023, the disclosure of which is hereby incorporated by reference herein in its entirety.

BACKGROUND

1. Technical Field

The present disclosure relates to a sentence management system and a storage medium storing a sentence management program.

2. Related Art

"Article/sentence copy and paste check tool 'COPIP-ERIN'", [online], SAKURABO Inc., last accessed on Jan. 6, 2023, <URL: https://saku-tools.info/copyperin/> discloses a sentence comparison tool for determining whether a sentence being examined has been obtained by copying and pasting a text on the Internet. This tool includes a list display of listing similarities between a sentence being examined and a candidate text on the Internet, and a comparison display of comparing the sentence being examined and the text.

In the sentence comparison tool of "Article/sentence copy and paste check tool 'COPIPERIN'", [online], SAKURABO Inc., last accessed on Jan. 6, 2023, <URL: https://saku-tools.info/copyperin/>, a comparison algorithm and a display manner are designed for determining whether a text on the Internet has been copied and pasted. Therefore, the sentence comparison tool of "Article/sentence copy and paste check tool 'COPIPERIN'", [online], SAKURABO Inc., last accessed on Jan. 6, 2023, <URL: https://saku-tools.info/copyperin/> has the disadvantage of being unsuitable for the purpose of grasping the meaning of the entire sentence.

SUMMARY

According to an aspect of the present disclosure, a sentence management system includes an obtainer configured to obtain a sentence of interest and a plurality of comparison sentences, a distance calculator configured to calculate a sentence distance between the sentence of interest and each of the comparison sentences, and a display processor configured to cause the sentence of interest, the comparison sentences, and a list of comparison sentence names arranged in order of the sentence distance to be displayed simultaneously. The distance calculator is configured to calculate the sentence distance by calculating a number of edits on a per-word basis between the sentence of interest and each of the comparison sentences, and the display processor is configured to cause a location of an edit between the sentence of interest and the comparison sentence to be displayed in a manner in accordance with the sentence distance.

According to another aspect of the present disclosure, a non-transitory computer-readable storage medium storing a sentence management program that causes a computer to execute obtaining a sentence of interest and a plurality of comparison sentences, calculating a sentence distance between the sentence of interest and each of the comparison sentences by calculating a number of edits on a per-word basis between the sentence of interest and each of the comparison sentences, and causing the sentence of interest, the comparison sentences, and a list of comparison sentence names arranged in order of the sentence distance to be displayed simultaneously and causing a location of an edit between the sentence of interest and the comparison sentence to be displayed in a manner in accordance with the sentence distance.

BRIEF DESCRIPTION OF THE DRAWINGS

FIG. 4 is a diagram illustrating sentence distance calculation in a first detailed example.

FIG. 5 is a diagram illustrating match portion identification in the first detailed example.

FIG. 7 illustrates an example of character colors and background colors in a display of a sentence of interest and a comparison sentence.

FIG. 8 is a diagram illustrating sentence distance calculation in a second detailed example.

FIG. 9 is a diagram illustrating match portion identification in the second detailed example.

FIG. 11 is a diagram illustrating sentence distance calculation in a third detailed example.

FIG. 12 is a diagram illustrating match portion identification in the third detailed example.

FIG. 14 is a diagram illustrating sentence distance calculation in a fourth detailed example.

FIG. 15 is a diagram illustrating match portion identification in the fourth detailed example.

FIG. 20 is a list for the range of edit distances and the range of similarities estimated by using triangle inequality.

DESCRIPTION OF EMBODIMENTS

Hereafter, embodiments according to the present disclosure will be described in detail. The present embodiment given below does not unreasonably limit the content of the present disclosure described in the appended claims, and not all of the configurations described in the present embodiment are indispensable constituent elements.

1. Sentence Management System

Figure 1:
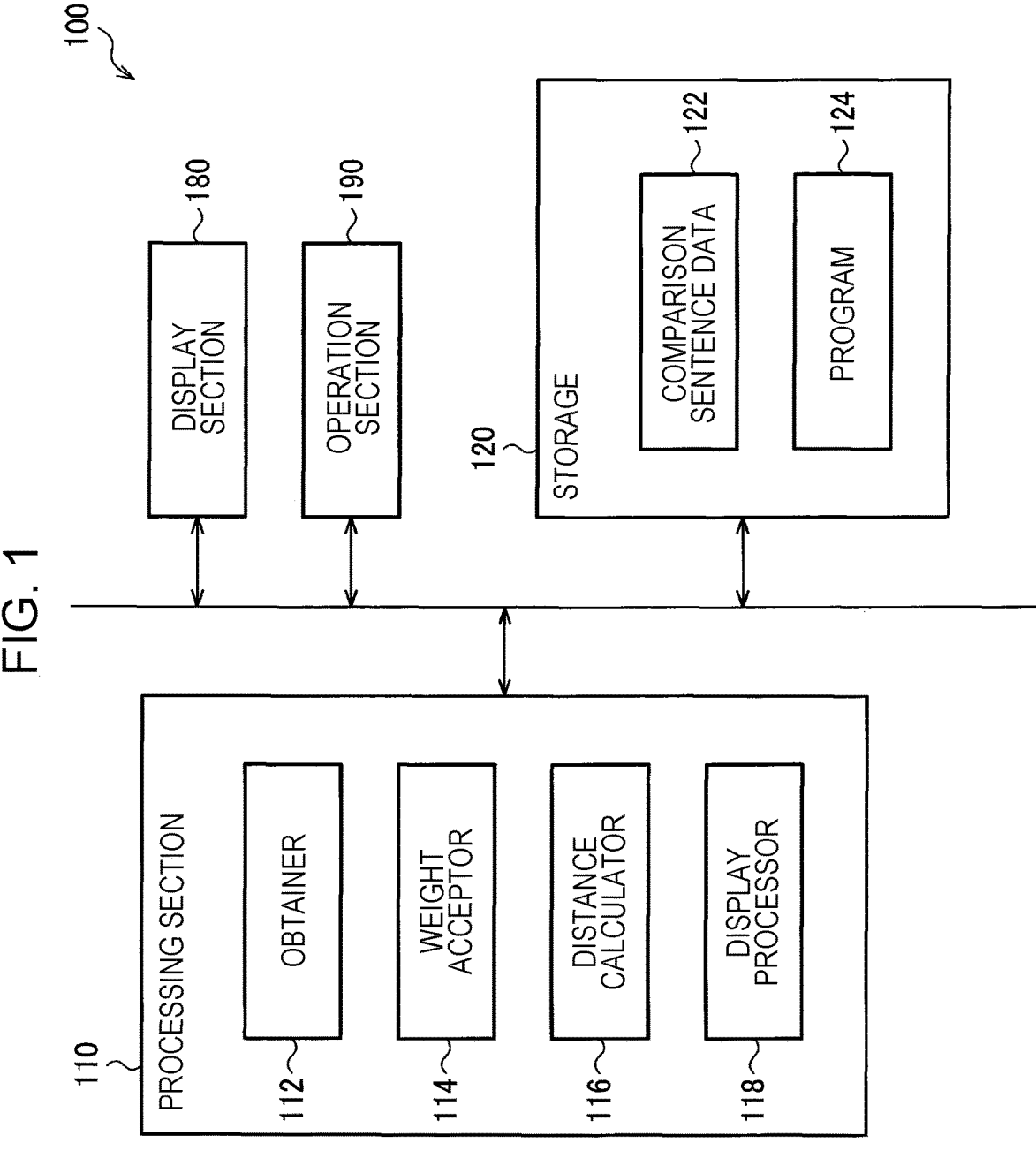
FIG. 1 illustrates an exemplary configuration of a sentence management system.

FIG. 1 illustrates an exemplary configuration of a sentence management system. A sentence management system 100 includes a processing section 110, a storage 120, a display section 180, and an operation section 190. The sentence management system 100 is constituted by an information processing device such as a personal computer (PC). Alternatively, the sentence management system 100 may be implemented by a distributed processing system or a cloud system using a plurality of information processing devices.

The display section 180 displays an image output by the processing section 110. The display section 180 is also referred to as a display, a monitor, or the like and is, for example, a liquid crystal display device. The operation section 190 receives an operation input from the user. Examples of the operation section 190 include a mouse, a pointing device such as a touch panel, a keyboard, buttons and a dial.

The storage 120 stores comparison sentence data 122 including a plurality of comparison sentences for comparison with a sentence of interest. The storage 120 may also store a program 124 in which the content of processing performed by sections of the processing section 110 is written. The storage 120 is a semiconductor memory, a hard disk drive, an optical drive, or the like. The semiconductor memory is, for example, a volatile memory, such as a random access memory (RAM), or a nonvolatile memory, such as an electrically erasable programmable read-only memory (EEPROM).

The processing section 110 is, by way of example, a processor. Examples of the processor include a central processing unit (CPU), a graphics processing unit (GPU), a microcomputer, a digital signal processor (DSP), an application specific integrated circuit (ASIC), and a field programmable gate array (FPGA). The processor may be one or more of the CPU, GPU, microcomputer, DSP, ASIC, FPGA, and the like. The processor executes the program 124, implementing the functions of sections of the processing section 110 as processing.

The processing section 110 is not limited to software processing as mentioned above and may be a circuit implementing the functions of the sections in a hardware manner. In this case, the storage 120 may not store the program 124.

The processing section 110 compares a sentence of interest with a comparison sentence and causes the display section 180 to display a result of the comparison. The sentence of interest is a sentence to be examined by using the sentence management system 100. The comparison sentence is a sentence to be compared with the sentence of interest. For example, among licenses of open-source software (hereafter abbreviated as OSS) described later, a license included with Oss to be used by the user is a sentence of interest. When the sentence management system 100 is applied to the case of a license of Oss, the application is directed to, for example, determining the type of a license. A license sentence indicating the type is a comparison sentence.

The sentence of interest and the comparison sentence are not limited to an OSS license and may be various sentences. By way of example, the sentence of interest and the comparison sentence may be typical sentences or sentences generated by editing the typical sentences. In such a case, the typical sentence is a comparison sentence, and a sentence generated by editing the typical sentence is a sentence of interest. Alternatively, the sentence of interest and the comparison sentence may be sentences generated by editing the sentences of the first edition, such as revision history. In this case, for example, the first edition is edited stepwise, thereby generating a plurality of editions. A sentence in each of the editions is a comparison sentence. A sentence of interest is compared with the sentence in each of the editions to determine which one of the sentences in the editions is closest to the sentence of interest.

The processing section 110 includes an obtainer 112, a distance calculator 116, and a display processor 118. The processing section 110 may further include a weight acceptor 114.

The obtainer 112 obtains a sentence of interest and a plurality of comparison sentences. The distance calculator 116 calculates a sentence distance between the sentence of interest and each of the comparison sentences. The display processor 118 causes the sentence of interest, the comparison sentences, and a list of comparison sentence names arranged in order of the sentence distance to be displayed simultaneously. The distance calculator 116 calculates the sentence distance by calculating the number of edits on a per-word basis between the sentence of interest and each of the comparison sentences. The display processor 118 causes the location of an edit between the sentence of interest and a comparison sentence to be displayed in a manner in accordance with the sentence distance. The comparison sentence name, which is a name for identifying a comparison sentence, may be the file name of the comparison sentence or another name associated with the comparison sentence.

Thereby, the sentence distance between a sentence of interest and each of comparison sentences is calculated, and a list display is provided such that the comparison sentences are arranged in the order of similarities based on the sentence distances. A comparison display is also provided, enabling the same and the difference between the sentence of interest and a comparison sentence to be made clear. In addition, according to the present embodiment, the difference in meaning between sentences is made easier to grasp as follows.

The difference in meaning between sentences is considered to result from a difference on a per-word basis more often than from a difference on a per-character basis. In a sentence comparison on a per-character basis, the difference in meaning between sentences is not appropriately evaluated. There is therefore a possibility that a difference in meaning between a sentence of interest and a comparison sentence is unlikely to be grasped. According to the present embodiment, a sentence distance is calculated by a word-by-word comparison, and therefore performing a comparison display based on the sentence distance facilitates grasping a difference in meaning between the sentence of interest and the comparison sentence.

In addition, if a list display and a comparison display are performed based on similarities calculated by algorithms different from each other, there is a possibility that the similarity being at an upper level in the list display is not linked with many matching portions in the comparison display. When the similarity between sentences is high and there are many matching portions between the sentences, the meanings of the sentences are considered to be highly likely to be close to each other; however, the similarity is not linked with the amount of matching portions, which makes it difficult to determine the difference in meaning between the sentences. According to the present embodiment, the list display is sorted in accordance with a sentence distance, and the location of an edit between the sentence of interest and a comparison sentence is displayed in a manner in accordance with the sentence distance. Thereby, the similarity at an upper level in the list display is more easily to be linked with many matching portions included in the comparison display. As a result, the difference in meaning between sentences is easily determined.

Since the difference in meaning between sentences is easily grasped in such a manner, for example, in a comparison between OSS licenses described later, a license type closest in the licensing terms to a license to be examined is easily discovered.

As used herein, the term "sentence distance" refers to an index of how similar the sentence of interest and the comparison sentence are. The more similar the sentences, the smaller the sentence distance. The term "edit" refers to making a change to a sentence. By way of example, the edit includes insertion, deletion, and replacement of a word. The replacement may include replacement of a word by a homophone, replacement of a word by a synonym, and replacement of a word by a near-synonym. The replacement may also include replacement of a word by a vaguely identical word. Examples of the vaguely identical word include a misspelled word, a mistake of a word, the plural form of a singular noun, the singular form of a plural noun, and a conjugated form of a verb. The term "the number of edits" refers to the number of edits made to a sentence when it is possible to transform the sentence into another sentence by making some edits to the sentence. The display of an edit location is, by way of example, highlighting a word to which the edit is made, but is not limited to this and may be any display that enables recognition of the word to which the edit is made. The phrase "a manner in accordance with a sentence distance" means that the displayed edit location changes in accordance with a sentence distance. That is, in some combination of a sentence of interest and a comparison sentence, a result of determining what word is edited changes in accordance with a calculated sentence distance. When the sentence distance changes in accordance with, for example, an edit weight, the displayed edit location also changes. This corresponds to displaying in a manner in accordance with a sentence distance.

In addition, in the present embodiment, the distance calculator 116 may calculate the sentence distance by performing an addition using an edit weight in accordance with an edit type to the number of edits.

Depending on the edit type, the effects of the edit on the meaning of a sentence are considered to vary. According to the present embodiment, the sentence distance may be calculated using an edit weight in accordance with an effect of an edit on the meaning of a sentence, which makes the meaning of the entire sentence easier to grasp. For example, when the edit weight for an edit that does not cause a change in meaning is reduced, the edit weight for an edit that causes a change in meaning is relatively increased in terms of the contribution to the sentence distance. This facilitates matching between the closeness in sentence distance and the closeness in meaning between sentences, and therefore, with reference to a sentence with a close sentence distance, the meaning of the entire sentence may be made easier to grasp.

The term "edit weight" refers to a weight coefficient that is used in accordance with an edit type when the number of edits is counted. The edit weight may be, for example, a predetermined value, a value input from the outside of the sentence management system 100, or a value stored in the storage 120. If the weighting in accordance with an edit type is not performed, for example, one edit may be counted as one for any edit type, or the same edit weight may be used for any edit type.

In addition, in the present embodiment, the weight acceptor 114 may accept a setting of the edit weight from the user.

According to the present embodiment, the user sets an edit weight, which makes it easier to discover a comparison sentence close to a sentence of interest. For example, when a comparison sentence similar to a sentence of interest has not been able to be discovered, a comparison sentence close in meaning to the sentence of interest is made easier to discover by reducing the edit weight for an edit that does not largely change the meaning.

For example, the user inputs an edit weight for each edit type by using the operation section 190, and the weight acceptor 114 accepts information on the input edit weight. The information on the input edit weight may be stored in the storage 120.

In addition, in the present embodiment, the obtainer 112 may also obtain a sentence distance between comparison sentences. The distance calculator 116 may use triangle inequality to avoid calculating a sentence distance between a sentence of interest and a comparison sentence between which the sentence distance is large.

Thereby, using the sentence distance between the sentence of interest and a comparison sentence and the sentence distance between the comparison sentence and another comparison sentence, the range of a sentence distance between the sentence of interest and the other comparison sentence may be evaluated by using triangle inequality. For a comparison sentence evaluated based on the range of a sentence distance such that the distance to the sentence of interest is large, calculation of a sentence distance to the sentence of interest may be omitted. Thereby, the calculation load for a sentence distance may be reduced.

The sentence distance between comparison sentences may be stored, for example, in the storage 120 or may be input from the outside of the sentence management system 100. The obtainer 112 obtains the sentence distance between comparison sentences stored in the storage 120 or input from the outside. The sentence distance between the comparison sentences may be calculated in advance by the distance calculator 116 or may be calculated outside the sentence management system 100.

In addition, in the present embodiment, the edit weight for an edit of replacement by a non-synonym may be heavier than the edit weight for an edit of replacement by a near-synonym included in a near-synonym database.

Replacement of a word by a non-synonym is considered to have a greater effect on the meaning of a sentence than replacement of the word by a near-synonym. According to the present embodiment, the edit weight for the replacement of a word by a non-synonym is greater than the edit weight for replacement of the word by a near-synonym, and thereby the edit weight for an edit that causes a change in meaning is greater than otherwise. Thereby, a comparison sentence close in meaning to a sentence of interest is made easier to discover.

In addition, in the present embodiment, the edit may include insertion, deletion, and replacement of a word. In addition, the edit may further include at least one of a misspelling of a word and a mistake of a word.

Counting the numbers of insertions, deletions, and replacements on a per-word basis as the number of edits enables the Levenshtein distance extended on a per-word basis to be calculated as a sentence distance. In addition, extending the Levenshtein distance on a per-word basis decreases the effects of an edit that does not cause a change in the meaning of a sentence, such as a misspelling of a word or a mistake of a word, on the sentence distance. Thereby, a comparison sentence close in meaning to a sentence of interest is made easier to discover.

In addition, in the present embodiment, the display processor 118 may cause the location of an edit to be displayed by emphasizing a non-matching word between a sentence of interest and a comparison sentence.

A non-matching word between a sentence of interest and a comparison sentence is highly likely to cause a difference in meaning between the sentence of interest and the comparison sentence. According to the present embodiment, since a non-matching word between a sentence of interest and a comparison sentence is highlighted, the difference in meaning between the sentence of interest and the comparison sentence may be easily determined.

In addition, the present embodiment may be carried out as a sentence management program. The sentence management program causes a computer to execute a step of obtaining a sentence of interest and a plurality of comparison sentences. The sentence management program causes the computer to execute a step of calculating a sentence distance between the sentence of interest and each of the comparison sentences by calculating the number of edits on a per-word basis between the sentence of interest and each of the comparison sentences. The sentence management program causes the computer to execute a step of causing the sentence of interest, the comparison sentences, and a list of comparison sentence names arranged in order of the sentence distance to be displayed simultaneously and causing the location of an edit between the sentence of interest and the comparison sentence to be displayed in a manner in accordance with the sentence distance.

A non-transitory information storage medium that is a computer-readable medium may store the sentence management program. The information storage medium is, for example, an optical disk, a memory card, a hard disk drive or a nonvolatile semiconductor memory.

2. Detailed Example of Sentence Comparison

Hereafter, description will be given of an example in which a sentence of interest and a comparison sentence are OSS licenses.

OSS is software for which source code is made freely available to the public, and such software may be provided as binary files. A wide variety of software is available as OSS, an individual piece of which is licensed to be used under certain conditions or to be incorporated into a product. The text of the licensing terms are called a license or a contract. A wide variety of licenses are provided for each piece of software included in OSS. These licenses are identical, similar, or completely different. When the two licenses are similar but different, the different portion includes an important feature in many cases.

Recently, actions for settling standard types of OSS licenses, which are called Software Package Data Exchange (SPDX), have been becoming active. The specifications of SPDX were established as ISO/IEC 5962:2021 in 2021. However, although the standard types are established as an international standard, a wide variety of OSS licenses opened in the past are organized such that not all of the OSS licenses are classified into the standard types. For example, at least 24 subspecies of a license called "MIT" have been recognized, and at least 16 subspecies of a license called "BSD" have been recognized. It is difficult to determine which of the types defined in SPDX corresponds to each of these subspecies.

If the type of an OSS license to be used and the difference between the license and the type are determined, the licensing terms of the OSS may be found. However, determining which one of the standard types corresponds to the license is burdensome and consumes a large amount of human resources. For example, it is assumed that about 500 pieces of OSS are used for embedded software of one product. Assuming that each piece of OSS includes about 100 source codes and a license is assigned to each of the source codes, licensing terms are to be determined for about 50,000 licenses. Regarding such a large amount of licenses, a large amount of human resources are desired for determining the types and the differences among the types.

In addition, the above description is not limited to the OSS licenses. In some cases, a template is prepared in creating a contract in a private business, and individual contracts are created by filling in the template. Such a case is described, for example, in JP-A-2002-230467. If a contract is mass-produced in such a way, in order to understand an individual contract, it is important to know what template is the key template for the individual contract and what are the differences between the template and the individual contract.

In addition, for both ordinary contracts and OSS licenses, when screen display, printing, or transmitting and receiving of data is performed, the line break position is changed in some cases. For example, for a given font size, the line break position may differ between printing on A4 paper and printing on B4 paper. Even when the line break position changes in such a manner, it is desirable to be able to determine the standard types as well as the differences among the standard types.

A detailed example of a sentence comparison performed by the sentence management system 100 according to the present embodiment will be described below. The standard types of Oss licenses are maintained as a database and correspond to the comparison sentence data 122 stored in the storage 120 illustrated in FIG. 1. The standard types of licenses are specific, that is, the number of standard types is limited and the license of each standard type is a specific sentence. For example, the types compliant with the specifications of SPDX described above are used. This database may be, for example, prepared in advance by the user and may also be downloaded from a network.

Figure 2:
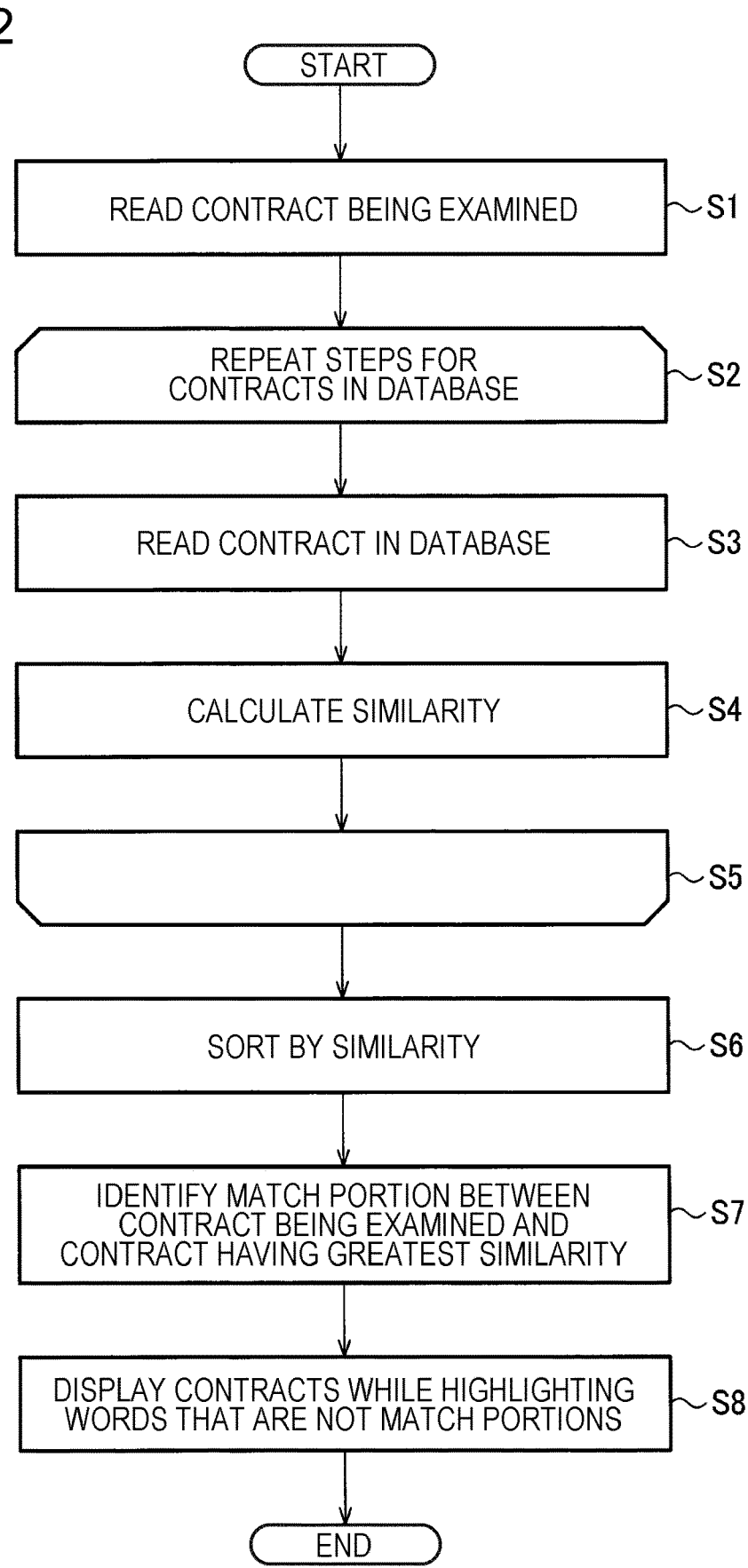
FIG. 2 is a flowchart of a process performed by a sentence management system.

FIG. 2 is a flowchart of a process performed by a sentence management system. At step S1, the obtainer 112 reads a contract being examined.

At steps S2 to S5, steps S3 and S4 are repeated for contracts in a database that are comparison sentences. At step S3, the obtainer 112 reads one contract in the database. At step S4, the distance calculator 116 calculates a similarity between the contract being examined and the contract of a comparison sentence.

At step S6, the distance calculator 116 sorts the contracts of comparison sentences in order of similarities calculated at steps S2 to S5.

At step S7, the distance calculator 116 identifies a match portion between the contract being examined and a contract having the highest similarity among the contracts of comparison sentences.

At step S8, the display processor 118 causes the display section 180 to display the contract being examined and the contract having the highest similarity among the contracts of comparison sentences and to highlight words that have not been identified as the match portions in each contract.

Figure 3:
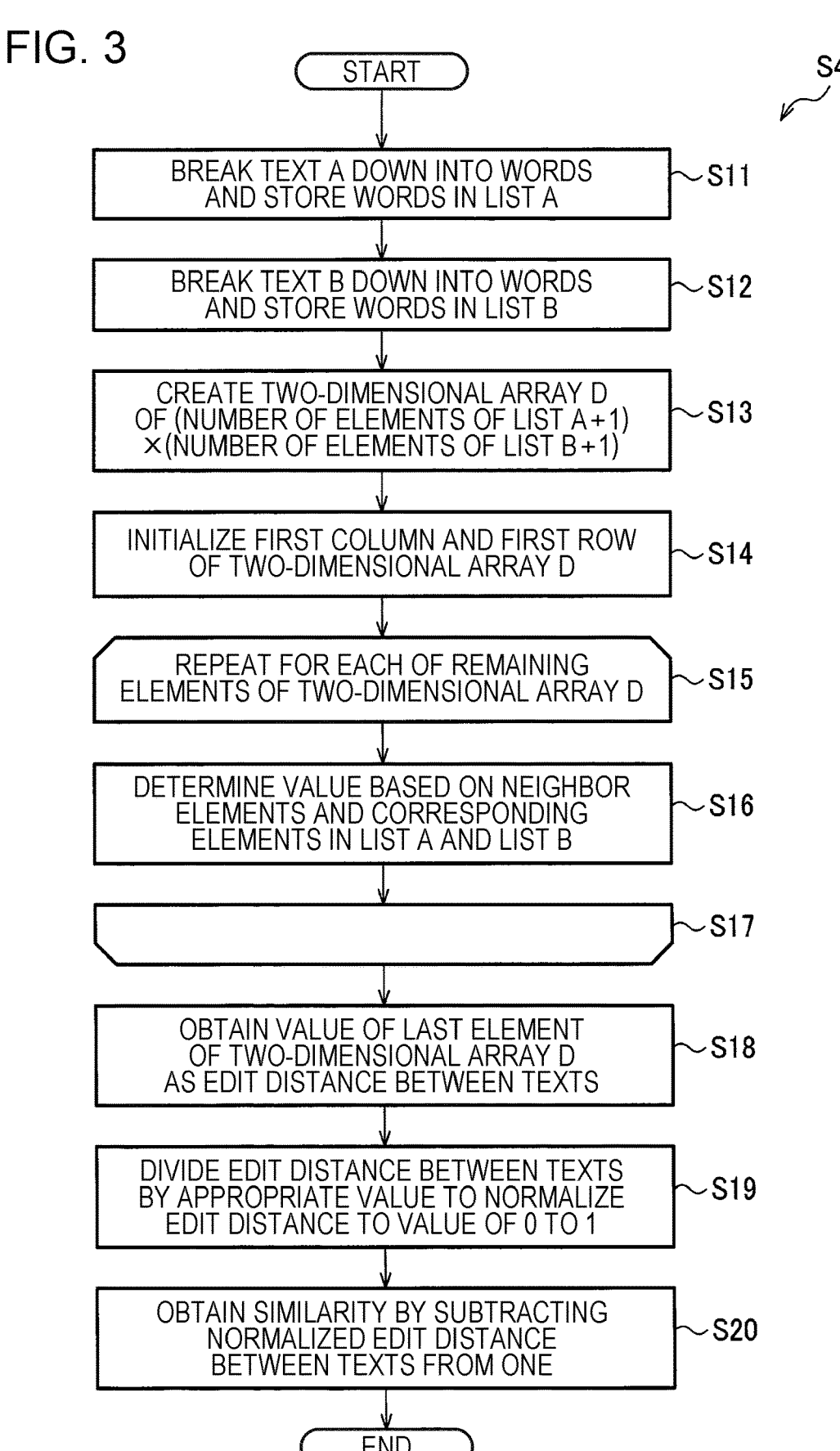
FIG. 3 is a detailed flowchart of a similarity calculation.

FIG. 3 is a detailed flowchart of a similarity calculation at step S4. The contract being examined that has been read at step S1 is referred to as text A, and the contract of a comparison sentence that has been read at step S3 is referred to as text B.

At step S11, the distance calculator 116 breaks text A down into words and stores the words without changing the order of words as list A. Step S11 may be executed once after step S1.

At step S12, the distance calculator 116 breaks text B down into words and stores the words without changing the order of words as list B.

The number of elements of list A is denoted by LA, and the number of elements of list B is denoted by LB. At step S13, the distance calculator 116 creates a two-dimensional array D[x, y] of a size of (LA+1)×(LB+1), where x is a column number and x=0, 1, 2, . . . , LA, and where y is a row number and y=0, 1, 2, . . . , LB.

At step S14, the distance calculator 116 initializes the first column D[0, y] and the first row D[x, 0] of the two-dimensional array.

At steps S15 to S17, the distance calculator 116 executes step S16 for each of the remaining elements D[1, 1] to D[LA, LB] of the two-dimensional array. The element being calculated at step S16 will be referred to as a target element.

At step S16, the distance calculator 116 determines the value of the target element based on the neighbor elements of the target element and the elements of list A and list B corresponding to the target element.

At step S18, the distance calculator 116 obtains the value of the last element D[LA, LB] of the two-dimensional array as an edit distance between text A and text B.

At step S19, the distance calculator 116 normalizes the edit distance to a value greater than or equal to zero and less than or equal to one by dividing the edit distance by an appropriate value.

At step S20, the distance calculator 116 obtains a similarity by subtracting the normalized edit distance from one. The sentence distance between the sentence of interest and a comparison sentence may be any distance as long as the sentence distance is an index indicating the distance between sentences, and may be any of the edit distance, the normalized edit distance and the similarity in this flowchart.

2.1. First Detailed Example

The similarity calculation at step S4, the match portion identification at step S7, and the display at step S8 will be described below using specific examples. Hereafter, taking the example of a typical sentence instead of an actual OSS license sentence, the processing content will be described. In addition, English, which is typically used for OSS licenses, is used by way of example; however, a similar approach may be applied to other languages.

Text A, which is a sentence of interest, and text B, which is a comparison sentence, are as follows. Although an example in which text A and text B do not include a line break is used here, text A and text B may each include a line break.

Text A "I feel very happy today. It is fine Sky and sea live because wind run fast."

Text B "It is fine today and I feeel very hapy. Sky and wind run fast because sea live."

FIG. 4 is a diagram illustrating sentence distance calculation in a first detailed example. In the present embodiment, the Levenshtein distance between sentences is calculated using an approach of extending the Wagner-Fischer method to a word-by-word comparison. The Levenshtein distance is also referred to as an edit distance hereafter.

Replacement, deletion, insertion, replacement by a near-synonym, correction of a misspelling, and so on are mentioned as edits counted for calculating the edit distance. In the first detailed example, the counted edits are replacement, insertion, and deletion. In addition, weighting is not performed in counting the number of edits. In other words, it may be said that the edit weights for replacement, insertion and deletion are equal when weighting is not performed. In the first detailed example, the edit weights for the replacement, insertion, and deletion are set to one.

The distance calculator 116 arranges word list A of text A in the column direction and arranges word list B of text B in the row direction. Elements of word list A are denoted by A[x], and elements of word list B are denoted by B[y]. The number of elements of word list A is LA=16, and the number of elements of word list B is LB=17. That is, the size of the two-dimensional array D[x, y] is (LA+1)×(LB+1)=17×18. If text A or text B includes a line break, the distance calculator 116 ignores the line break to generate word list A or word list B.

The distance calculator 116 initializes the elements in the 0th row to D[x, 0]=x×v, and initializes the elements in the 0th column to D[0, y]=y×v. The coefficient v is an edit weight for insertion and deletion. In this example, v=1.

The distance calculator 116 calculates the value of the element D[x, y] in order from the smallest to the largest of the row number and the column number. That is, the distance calculator 116 calculates the element D[x, 0] in order of the column number x=0, 1, 2, . . . , 16 for the 0th row, then calculates the element D[x, 1] in order of the column number x=0, 1, 2, . . . , 16 for the first row, and repeats the calculation for up to the 17th row. The distance calculator 116 calculates the element D[x, y] using equation (1) given below. A[x]= B[y] represents that element A[x] of word list A matches element B[y] of word list B. In this example, matching of words means that the spellings of words match each other, min( ) is a function of returning the smallest value given by the arguments, u is an edit weight for replacement, and v is an edit weight for insertion and deletion. In this example, u=v=1.

$$D\{x, y\} = \begin{cases} D[x-1, y-1]: \text{ if } A[x-1] = B[y-1] \\ \min(D[x-1, y-1] + u, \\ D[x, y-1] + v, D[x-1, y] + v]: \text{ if } A[x-1] \neq B[y-1] \end{cases} \quad (1)$$

As a result of the calculation described above, the matrix illustrated in FIG. 4 is obtained. The hatched matrix elements indicate matrix elements in which A[x]=B[y]. The distance calculator 116 determines an element D[16, 17], in which both the column number x and the row number y are greatest, as the edit distance between text A and text B.

The distance calculator 116 calculates the similarity between text A and text B from the edit distance. It is desirable that the larger the value of similarity, the more the two texts be similar, the smaller the value of similarity, the more the two texts be different, and the similarity be expressed as a percentage. When the two texts are completely different, the distance between the two texts matches the number of words of a longer text. Therefore, the distance calculator 116 divides the distance between texts by the number of words of the longer text and subtracts the obtained result from one, thereby determining the similarity. In the example in FIG. 4, the distance between texts is D[16, 17]=15. In addition, the number of elements of the longer text is LB=17. Thereby, the similarity is (1−15/17)× 100%=11.8%.

Specifically, the distance calculator 116 calculates a similarity S using equation (2) given below. Since, in the example in FIG. 4, LA=16, LB=17, D[16, 17]=15, u=v=1, S=1−15/(1×16+1×(17−16))=1−15/17=0.118. When expressed as a percentage, S=11.8%, which is the same as the calculation result mentioned above.

$$S = 1 - \frac{D[LA, LB]}{u \times \min(LA, LB) + v \times |LA - LB|} \quad (2)$$

FIG. 5 is a diagram illustrating match portion identification in the first detailed example. Likening each element in the two-dimensional array D[x, y] to a node and the adjacency relationship between elements to a link and applying a graph theory enables words corresponding to each other between texts to be identified. Specifically, assuming that the element D[LA, LB] with the largest row number and the largest column number is the origin, dynamic programming similar to the Dijkstra method is used.

Among adjacencies between elements, valid links are the links that satisfy Condition 1 or Condition 2 given below.
Condition 1:
If the words of text A and text B corresponding to (x, y) match, that is, A[x]=B[y],
the link of (x, y) and (x+1, y+1) if D[x, y]=D[x+1, y+1] is satisfied.
Condition 2:
If the words of text A and text B corresponding to D[x, y] do not match, that is, A[x]≠B[y],
the link of (x, y) and (x+1, y+1) if D[x, y]+u=D[x+1, y+1] is satisfied,
the link of (x, y) and (x+1, y) if D[x, y]+v=D[x+1, y] is satisfied,
the link of (x, y) and (x, y+1) if D[x, y]+v=D[x, y+1] is satisfied.

Among paths connecting the element D[LA, LB] with the largest row number and the largest column number and the element D[0, 0] with the smallest row number and the smallest column number, the distance calculator 116 determines a path that maximizes the number of matches of a word corresponding to row numbers and column numbers, and regards the matched word in the path as a corresponding word.

Specifically, the distance calculator 116 prepares the two-dimensional array R[x, y] in which each element is a three-dimensional vector and calculates each of the elements. The first element of the three-dimensional vector is a column number x, the second element is a row number y, and the third element is the number of matched words in the examined path. While an arrow indicating a vector is provided in a mathematical expression, the arrow is omitted in a sentence. For example, regarding R[x, y], while an arrow is provided above R in a mathematical expression, R is presented without the arrow in a sentence.

First, the distance calculator 116 substitutes the value of equation (3) given below for the element R[LA, LB] in which the row number and the column number are largest. In the example in FIG. 5, R[16, 17]=(16, 17, 0).

$$R[LA, LB] = \begin{cases} \begin{pmatrix} LA \\ LB \\ 0 \end{pmatrix} & : \text{if } A[LA] \neq B[LB] \\ \begin{pmatrix} LA \\ LB \\ 1 \end{pmatrix} & : \text{if } A[LA] = B[LB] \end{cases} \quad (3)$$

12

Then, the distance calculator 116 determines R[x, y] in a direction in which the row number and the column number decrease. The distance calculator 116 determines R[x, y] using equation (4) if Condition 1 is satisfied, and determines R[x, y] using equation (5) if Condition 2 is satisfied, as given below.
Condition 1:
If the words of text A and text B corresponding to (x+1, y+1) match, that is, A[x]=B[y], and there is a value in R[x+1, y+1], $$\vec{R}[x, y] = \begin{pmatrix} x+1 \\ y+1 \\ z(\vec{R}[x+1, y+1]) + 1 \end{pmatrix} \quad (4)$$

Condition 2:
If the words of text A and text B corresponding to (x+1, y+1) do not match, that is, A[x]≠B[y], $$\quad (5)$$

$$\vec{R}[x, y] =$$

$$\begin{cases} \begin{pmatrix} x+1 \\ y+1 \\ z(\vec{R}[x+1, y+1]) \end{pmatrix} & : \text{if} \begin{pmatrix} D[x, y] + u = D[x+1, y+1] \text{ and} \\ z(\vec{R}[x+1, y+1]) \geq z(\vec{R}[x+1, y]) \text{ and} \\ z(\vec{R}[x+1, y+1]) \geq z(\vec{R}[x, y+1]) \end{pmatrix} \\ \begin{pmatrix} x+1 \\ y \\ z(\vec{R}[x+1, y+1]) \end{pmatrix} & : \text{if} \begin{pmatrix} D[x, y] + v = D[x+1, y] \text{ and} \\ z(\vec{R}[x+1, y]) > z(\vec{R}[x+1, y+1]) \text{ and} \\ z(\vec{R}[x+1, y]) > z(\vec{R}[x, y+1]) \end{pmatrix} \\ \begin{pmatrix} x \\ y \\ z(\vec{R}[x, y+1]) \end{pmatrix} & : \text{if} \begin{pmatrix} D[x, y] + v = D[x, y+1] \text{ and} \\ z(\vec{R}[x, y+1]) > z(\vec{R}[x+1, y+1]) \text{ and} \\ z(\vec{R}[x, y+1]) > z(\vec{R}[x+1, y]) \end{pmatrix} \end{cases}$$

As expressed by equation (6) given below, z (r) is a function for extracting the third element of a three-dimensional vector r. Since LA=16 and LB=17 in the example in FIG. 5, the distance calculator 116 calculates the element R[x, 17] in order of the column number x=16, 15, . . . , 0 for the 17th row, then calculates the element R[x, 16] in order of the column number x=16, 15, . . . , 0 for the 16th row, and repeats the calculation for up to the 0th row.

$$z(\vec{r}) = \begin{pmatrix} 0 \\ 0 \\ 1 \end{pmatrix} \cdot \vec{r} \quad (6)$$

After the distance calculator 116 has determined all the elements of the two-dimensional array R[x, y], the distance calculator 116 sequentially traces the row and column numbers stored in each element in order from R[0, 0] to obtain an intended path. That is, the distance calculator 116 reads the column number of the first element and the row number of the second element stored in R[0, 0], and then reads the column number of the first element and the row number of the second element stored in the element R[(1, 0, 0)·R[0, 0], (0, 1, 0)·R[0, 0]] of the read column and row numbers. The distance calculator 116 repeats the reading mentioned above until arriving at the element R[LA, LB] in which the row and column numbers are largest. The distance calculator 116 lists combinations of the row and column numbers read in this process, thereby obtaining the intended path.

In FIG. 5, an element belonging to the identified path is indicated by a bold frame. The hatched elements of this path are equivalent to matching words between text A and text B, and elements of list A and list B corresponding to the matching words are hatched. Although there are 15 pairs of (x, y) satisfying A[x]=B[y], the path is determined based on the two-dimensional array R[x, y] and, as a result, the number of matching words is finally seven.

Figure 6:
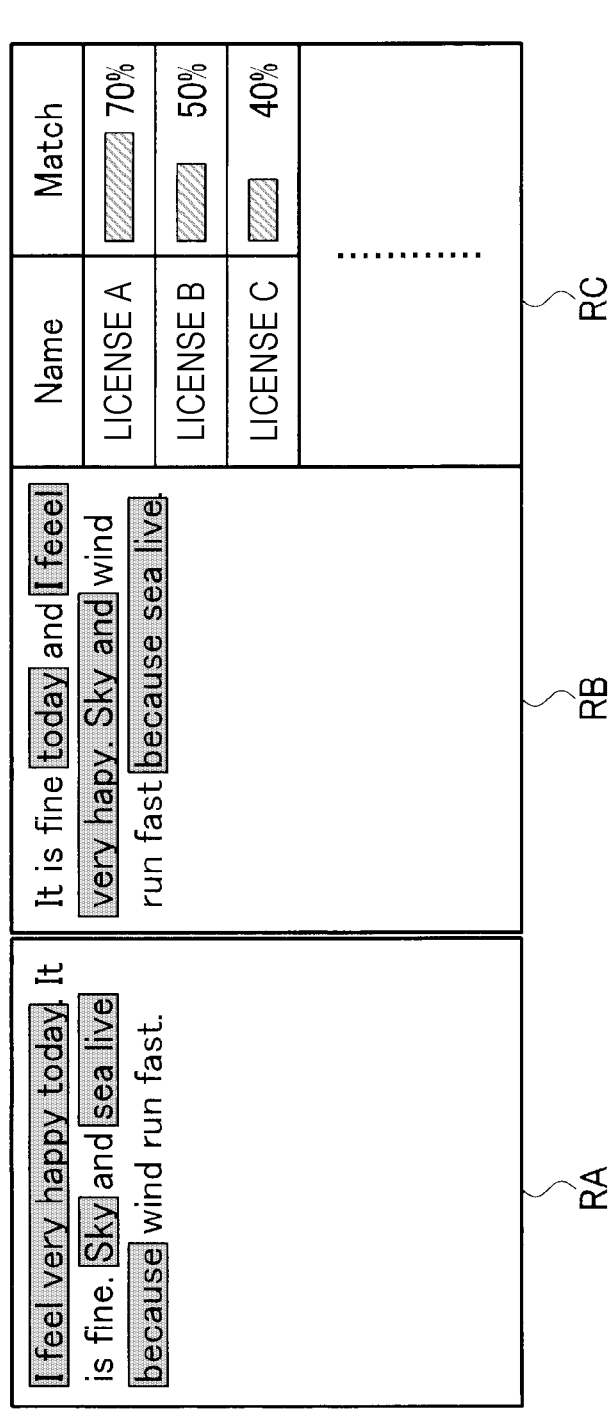
FIG. 6 depicts an exemplary display in the first detailed example.

FIG. 6 depicts an exemplary display in the first detailed example. The display processor 118 causes the display section 180 to display an image including an area RA for displaying a sentence of interest, an area RB for displaying a comparison sentence, and an area RC for displaying a list of comparison sentences and similarities. The areas RA and RB are displayed next to each other as a comparison display, and the area RC is provided on the right side of the areas RA and RB. However, the arrangement of the areas RA to RC is not limited to that in FIG. 6.

In the area RC, the names of license types of comparison sentences are displayed as a list in which the names are sorted in order of highest similarity. In the figure, the names are referred to as "license A", "license B", "license C", . . . The similarity is, for example, expressed by a numerical value, displayed as a bar, or displayed using both methods. FIG. 6 depicts an example in which both the numerical expression and bar display are displayed.

In the area RA, a sentence of interest is displayed, and non-matching words between the sentence of interest and a comparison sentence are highlighted. In the area RB, the comparison sentence is displayed, and non-matching words between the sentence of interest and the comparison sentence are highlighted. In FIG. 6, an example in which text A is displayed as the sentence of interest and text B is displayed as the comparison sentence is depicted. If each of text A and text B includes a line break, the display processor 118 causes each of text A and text B to be displayed in accordance with the position of the line break included in each of text A and text B.

In OSS license comparison, the sentence of interest is a license being examined and the comparison sentence is a license type. The comparison sentence may be license A with the highest similarity in the license list displayed in the area RC or may be a license selected by the user from the license list displayed in the area RC.

FIG. 7 illustrates an example of character colors and background colors in the display of a sentence of interest and a comparison sentence. In such a manner, elements are classified into four categories and an appropriate character color and an appropriate background color are set for each element, which enables difference portions to be highlighted. Regarding a white space between elements, if the elements before and after the white space are the same in category, the color of the white space is set to the color of the category.

The similarity calculation and displays performed as described above makes it clear what type of license some license corresponds to or which template is used for creating the license, and makes it clear what are differences from the type or the template. Alternatively, information is obtained for determining that the license is not included in the existing types or that the license is not created using the existing template. In addition, even if line break positions are different, or even if different near-synonyms are used, sentences the contents of which are substantially the same may be found.

2.2. Second Detailed Example and Third Detailed Example

Description is given of an example of the case where the edit weights for insertion and deletion differ from the edit weight for replacement.

FIG. 8 is a diagram illustrating sentence distance calculation in a second detailed example. In the figure, the numerical value of D[x, y] is rounded to the first decimal place. In this example, the edit weights for insertion and deletion are v=0.667, and the edit weight for replacement is u=1. The ratio is v:u=0.667:1=2:3. The distance calculator 116 calculates each element of the two-dimensional array D[x, y] using the above equation (1), determines D [LA, LB] as an edit distance, and calculates the similarity S using equation (2) given above. In the example in FIG. 8, the edit distance is D[16, 17]=11.3, and the similarity is S=1–11.3/(1×16+0.667×(17–16))=0.322.

FIG. 9 is a diagram illustrating match portion identification in the second detailed example. The distance calculator 116 calculates each element of the two-dimensional array R[x, y] using the above equations (3) to (6) and sequentially traces the row and column numbers stored in each element in order from R[0, 0] to specify a path. Although there are 15 pairs of (x, y) satisfying A[x]=B[y] in this example, the path is determined based on the two-dimensional array R[x, y] and, as a result, the number of matching words is finally eight.

Figure 10:
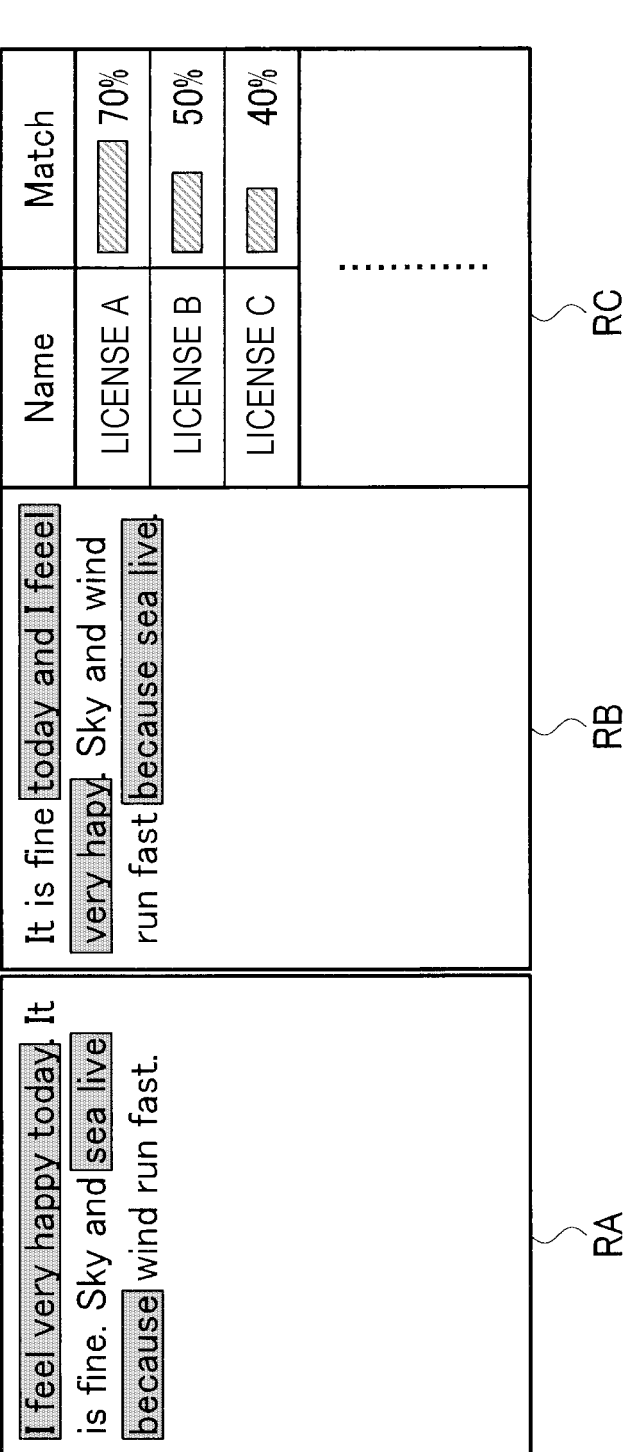
FIG. 10 depicts an exemplary display in the second detailed example.

FIG. 10 depicts an exemplary display in the second detailed example. The display processor 118 performs a comparison display of comparing a sentence of interest and a comparison sentence using the character colors and background colors illustrated in FIG. 7 based on the matching words identified with reference to FIG. 9. In addition, the display processor 118 causes a comparison sentence list to be displayed. In the comparison sentence list, comparison sentences are sorted in the order of similarities based on the similarity between the sentence of interest and each comparison sentence calculated as in FIG. 8.

FIG. 11 is a diagram illustrating sentence distance calculation in a third detailed example. In this example, the edit weights for insertion and deletion are v=0.875, and the edit weight for replacement is u=1. The ratio is v:u=0.875:1=7:8. The distance calculator 116 calculates each element of the two-dimensional array D[x, y] using the above equation (1), determines D[LA, LB] as an edit distance, and calculates the similarity S using the above equation (2). In the example in FIG. 11, the edit distance is D[16, 17]=13.6, and the similarity is S=1–13.6/(1×16+0.875×(17–16))=0.194.

FIG. 12 is a diagram illustrating match portion identification in the third detailed example. The distance calculator 116 calculates each element of the two-dimensional array R[x, y] using the above equations (3) to (6) and sequentially traces the row and column numbers stored in each element in order from R[0, 0] to specify a path. Although there are 15 pairs of (x, y) satisfying A[x]=B[y] in this example, the path is determined based on the two-dimensional array R[x, y] and, as a result, the number of matching words is finally seven.

Figure 13:
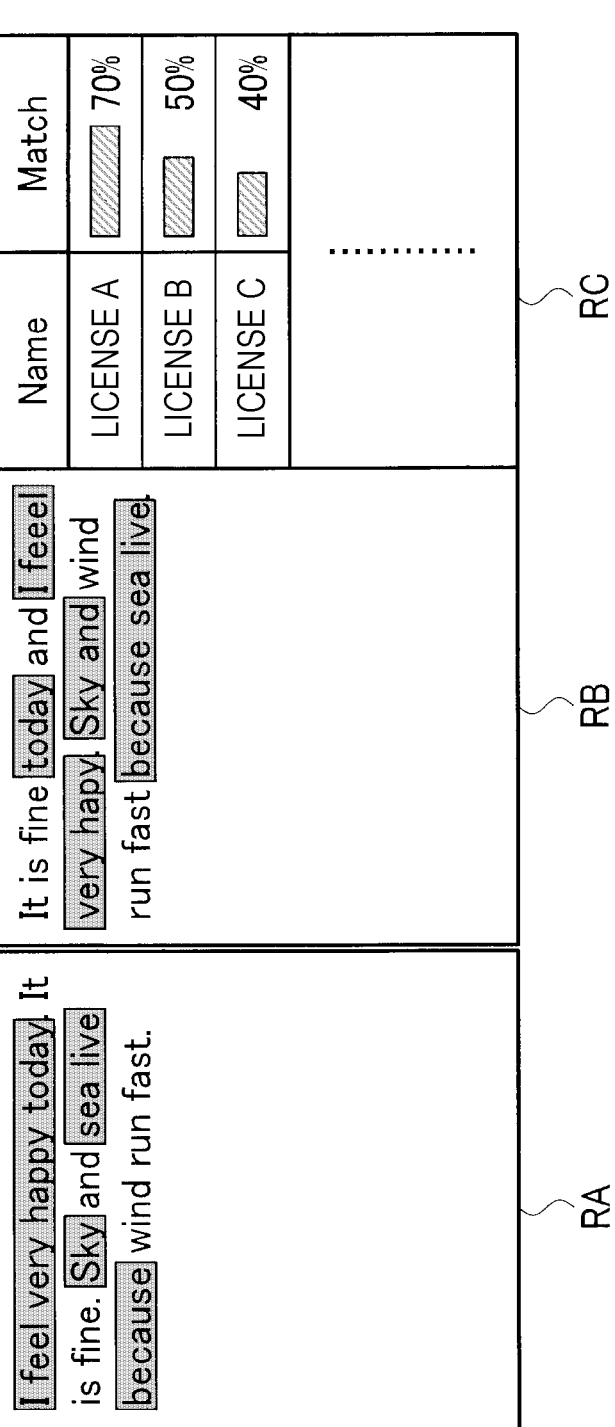
FIG. 13 depicts an exemplary display in the third detailed example.

FIG. 13 depicts an exemplary display in the third detailed example. The display processor 118 performs a comparison display of comparing a sentence of interest and a comparison sentence using the character colors and background colors illustrated in FIG. 7 based on the matching words identified with reference to FIG. 11. In addition, the display processor 118 causes a comparison sentence list to be displayed. In the comparison sentence list, comparison sentences are sorted in the order of similarities based on the similarity between the sentence of interest and each comparison sentence calculated as with reference to FIG. 12.

A comparison of the path when v:u=2:3 illustrated in FIG. 9 and the path when v:u=7:8 illustrated in FIG. 12 shows that the path and matching words change depending on the edit weights. With this, it is shown that there is a change in the display manner of the sentence of interest and the comparison sentence between FIG. 10 and FIG. 13. In addition, a comparison of the similarity S=0.322 when v:u=2:3 and the similarity S=0.194 when v:u=7:8 shows that the similarity changes depending on the edit weights. From the above, changing the edit weights is expected to enable a sentence comparison to be more suitable for determining the type of a license. For example, when every license type has a low similarity, changing edit weights is expected to have an advantageous effect of finding a type having a high similarity or increasing the number of matching words.

2.3. Fourth Detailed Example

Description will be given of an example in calculation of an edit distance in which, in addition to the numbers of replacements, deletions, and insertions, the number of corrections of misspellings is included in the calculation.

FIG. 14 is a diagram illustrating sentence distance calculation in a fourth detailed example. FIG. 15 is a diagram illustrating match portion identification in the fourth detailed example. In this example, the edit weights for insertion and deletion are v=0.875, the edit weight of replacement is u=1, and the edit weight for a correction of a misspelling is usp=0.25. The ratio is v:u:usp=0.875:1:0.25=7:8:2.

The distance calculator 116 calculates each element of the two-dimensional array D[x, y] using the above equation (1), determines D[LA, LB] as an edit distance, and calculates the similarity S using the above equation (2). The distance calculator 116 calculates each element of the two-dimensional array R[x, y] using the above equations (3) to (6) and sequentially traces the row and column numbers stored in each element in order from R[0, 0] to specify a path.

At this point, for elements for which correction of a misspelling is determined, the distance calculator 116 replaces u in the above equations (1) and (5) with usp. In the example in FIG. 14, A[2]="feel" and A[4]="happy" correspond to corrections of misspellings for B[7]="feeel" and for B[9]="hapy", respectively. Whether there is a misspelling is determined based on, for example, the Levenshtein distance between words. In the example in FIG. 14, the determination conditions for a misspelling are that each of the character count of two words is greater than or equal to four and the Levenshtein distance between the words is one or two. However, the determination conditions for a misspelling may be considered as various conditions. For example, the decision criteria may be such that, with reference to a larger one of the numbers of characters of two words, the Levenshtein distance between the words is less than 15%.

Figure 16:
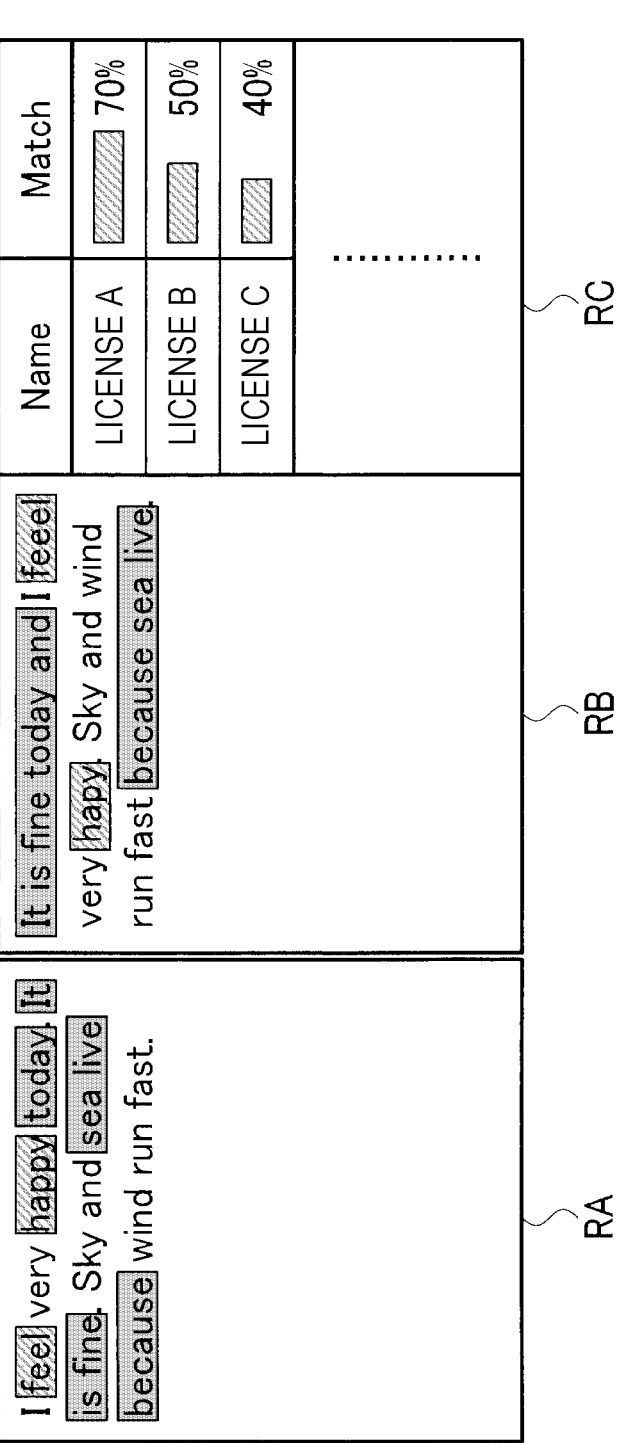
FIG. 16 depicts an exemplary display in the fourth detailed example.

FIG. 16 depicts an exemplary display in the fourth detailed example. In the comparison display, the display processor 118 causes a misspelling correction portion to be highlighted such that the correction portion is discriminated from a non-matching word and a matching word, in addition to display with the character color and the background color illustrated in FIG. 7. For example, the display processor 118 causes a word corresponding to a misspelling correction to be displayed such that the character color is black and the background color is yellow.

It is desirable that the edit weight for a misspelling correction be set to a value smaller than the edit weight for replacement. Setting the edit weight for a misspelling correction to zero enables the misspelling to be regarded as the matching of words.

In calculating an edit distance, in addition to the numbers of replacements, deletions, and insertions, the number of replacements by a near-synonym may be included for the calculation, or the number of misspelling corrections and the number of replacements by a near-synonym may be included for the calculation. The replacement by a near-synonym is, for example, replacement of a word by a hypernym, replacement of a word by a hyponym, or replacement of a word by a synonym. The replacement by a near-synonym is determined using, for example, a thesaurus database. The edit weight for replacement by a near-synonym and the edit weight for misspelling correction may be the same or different. It is desirable that the edit weight for the replacement by a near-synonym be set to a value smaller than the edit weight for replacement. Setting the edit weight for replacement by a near-synonym to zero enables the near-synonym to be regarded as the matching of words.

The edit distance described in the first to third detailed examples may be regarded as a distance obtained by extending the Levenshtein distance on a per-word basis. Extending the Levenshtein distance on a per-word basis enables replacement of a word that does not cause a change in meaning or a misspelling to be taken into account, as in the fourth detailed example, other than a simple match or mismatch of a word.

3. Method for Simplifying Searching by Using Triangle Inequality

To search a large number of license types for a license type with the highest similarity to a license of interest, for example, the similarities between all the types and the license of interest are to be calculated. In a method described below, the similarity range of each type is estimated by using the triangle inequality. Therefore, if the similarity is calculated only for some of the types, a type with the highest similarity may be searched for.

Figure 17:
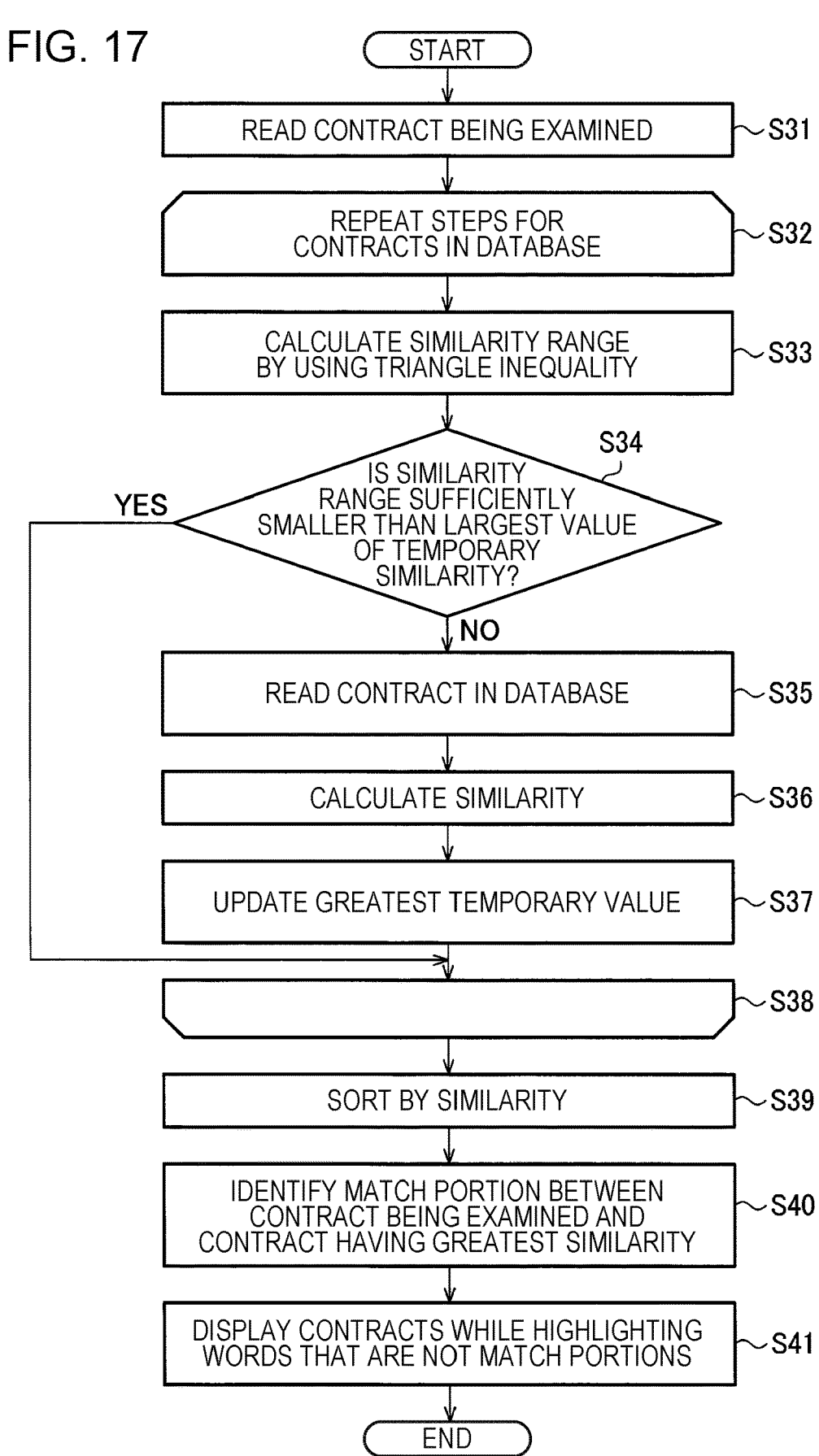
FIG. 17 is a flowchart of a method for simplifying searching by using triangle inequality.

FIG. 17 is a flowchart of a method for simplifying searching by using triangle inequality. At step S31, the obtainer 112 reads a contract being examined.

At steps S32 to S38, steps S33 to S37 are repeated for contracts in a database that are comparison sentences.

At step S33, the distance calculator 116 calculates the range of similarities between the contract being examined and the contract of a comparison sentence by using triangle inequality.

At step S34, the distance calculator 116 determines whether the range of similarities is sufficiently smaller than the largest value of a temporary similarity. If the range of similarities is sufficiently smaller than the largest value of a temporary similarity, the distance calculator 116 does not execute steps S35 to S37; if the range of similarities is not sufficiently smaller than the largest value of the temporary similarity, the distance calculator 116 proceeds to step S35.

At step S35, the obtainer 112 reads a contract of a comparison sentence from the database.

At step S36, the distance calculator 116 calculates the similarity between the contract being examined and the contract of a comparison sentence.

At step S37, the distance calculator 116 updates the temporary similarity based on the similarity obtained at step S36. Specifically, if the similarity obtained at step S36 is higher than the current temporary similarity, the distance calculator 116 sets the obtained similarity as a new temporary similarity.

At step S39, the distance calculator 116 sorts the contracts of comparison sentences in order of similarities calculated at steps S32 to S38. Regarding a contract for which a similarity calculation is omitted, the distance calculator 116 uses the upper limit of the similarity range estimated from the triangle inequality as the similarity of the contract.

At step S40, the distance calculator 116 identifies a match portion between the contract being examined and a contract having the highest similarity among the contracts of comparison sentences.

At step S41, the display processor 118 causes the display section 180 to display the contract being examined and the contract having the highest similarity among the contracts of comparison sentences and to highlight words that have not been identified as the match portions in each contract.

Figures 18, 19:
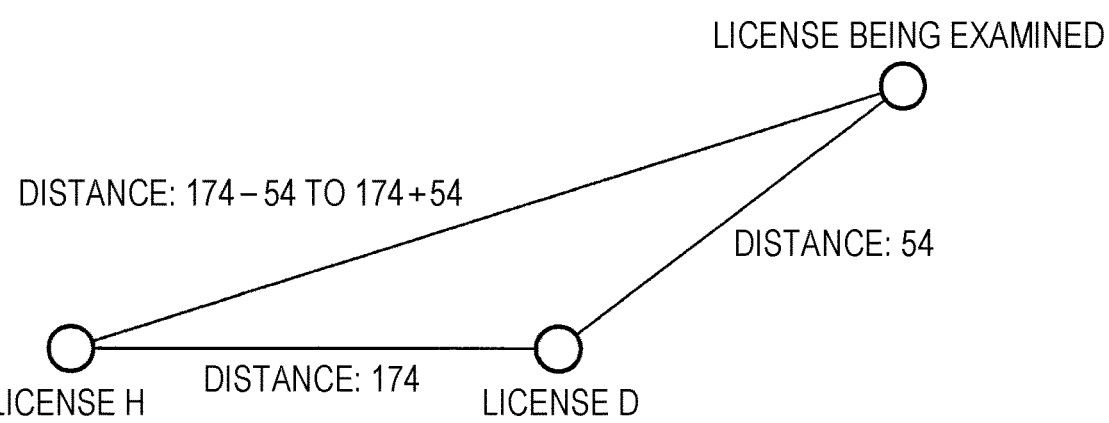
FIG. 18 illustrates an example of mutual edit distances between comparison sentences.
FIG. 19 illustrates an example of the range of similarities estimated by using triangle inequality.

A specific example of the method for simplifying searching by using the triangle inequality will be described below. As illustrated in FIG. 18, a mutual edit distance between comparison sentences is calculated in advance. For example, the distance calculator 116 may calculate a mutual edit distance between comparison sentences and store the information in the storage 120. Alternatively, the mutual edit distance between comparison sentences may be written to the storage 120 from the outside of the sentence management system 100. Then, the obtainer 112 reads out the mutual edit distance between comparison sentences from the storage 120 and, using the information, the distance calculator 116 performs an estimate by using the triangle inequality.

FIG. 18 illustrates an example of mutual edit distances when licenses A to M are stored in a database. Like the edit distance between a sentence of interest and a comparison sentence, the edit distance between comparison sentences is calculated by a word-by-word comparison. The edit distance between the same licenses is zero and therefore the calculation of the edit distance may not be performed.

FIG. 19 illustrates an example of the range of similarities estimated by using triangle inequality. In this example, it is assumed that the edit distance between the license being examined and license D is already calculated as 54. Assuming that the edit distance between the license being examined and license D is D1 and that the edit distance between license D and license H is D2, a range DR of the edit distances between the license being examined and license H to be examined satisfies a triangle inequality $|D1-D2| \leq DR \leq D1+D2$. Substituting D1=54 and D2=174 in the triangle inequality yields $174-54=120 \leq DR \leq 228=174+54$.

FIG. 20 is a list for the range of edit distances and the range of similarities estimated by using triangle inequality. The edit distance between license D and the license being examined is already calculated as 54, and the similarity is 79.2%. This known similarity corresponds to the temporary similarity at step S34. Only license E has a possibility of exceeding the similarity of 79.2%. The distance calculator 116 performs a similarity calculation between a license being examined and license E, and similarity calculations are omitted for licenses A to C and F to M. It is assumed that the similarity between the license being examined and license E is calculated to be, for example, 86.1%. In this case, license E is a license with the highest similarity. In the displayed list, the calculated similarities are displayed for licenses D and E, the upper limit values of the similarity ranges estimated by using triangle inequality are displayed for licenses A to C and F to M.

4. Regarding Related Art

Comparison between some related art examples and the present embodiment will be described.

4.1. WinMerge, TortoisGitMerge

Some tools of comparing two texts and highlighting a difference are known among software engineers. In addition, not only a comparison between files but also a comparison between file configurations on a per-folder basis may be made.

Such existing comparison tools are not able to search a sentence with the highest similarity. In addition, regarding highlighting of differences, after a row-by-row comparison has been performed, a word-by-word or character-by-character comparison is performed. Therefore, if the line break position differs between two texts to be compared, a desirable display result is not obtained.

According to the present embodiment, a type closest in similarity to a license being examined may be searched for. In addition, since a word-by-word comparison is performed, there is no effect of a line break. Even if the line break position differs between texts, a desirable display result is obtained.

4.2. Grep

A tool of searching for a specified text in a file or a folder and extracting the specified text is also well known among software engineers. This tool is sometimes used as the name of a function and is included in most of the famous text editors.

Existing search tools are able to search matching and similar sentences but are not able to verify whether the similarities are high or low. Restrictions are desired to be imposed on searching similar objects, or the user is desired to come up with a way to search similar objects. In addition, there are restrictions on searching a text including a long sentence over a line break, such that although matching portions are highlighted, differences are not highlighted.

According to the present embodiment, a list of similarities between the license being examined and types is displayed, which enables the user to verify whether the similarities are high or low. Since a word-by-word comparison is performed, there is no effect of a line break, which enables even a text including a long sentence over a line break to be searched. In addition, since a non-matching portion between texts is highlighted in a comparison display, differences are highlighted.

4.3. Copiperin

When sentence creation is subcontracted, the subcontractor sometimes plagiarizes a sentence to violate copyright laws. A tool used for the contractor to verify whether such a plagiarism is present is known. Specifically, the sentence to be verified is compared with an article on the Internet, and a portion with a high similarity of the sentence is highlighted because there is some doubt that the portion was plagiarized.

Since the portion is searched for from texts on the Internet, candidates serving as comparison candidate texts are fluid. Therefore, the result varies each time the search is performed, which does not provide reproducibility of searches. The search range is not able to be strictly defined in advance, and comparisons with all the candidates at the time point are always to be made. There is no description of a method for effectively reducing search candidates. Uniform Resource Identifiers (URIs) to be excluded may be set, which depends on the ingenuity of the user. In addition, the similarities between texts are on a per-character basis, and neither stemming nor a thesaurus is used during creation of a list. As a result, negligible differences are evaluated to be large. A fuzzy comparison is performed only for a comparison display, and the list and the comparison display provide difference evaluations. Therefore, high ranking in a list may be inconsistent with a large number of matching portions in some cases. Matching portions are highlighted in the comparison display, which is not suitable for confirmation of the locations of mismatches.

According to the present embodiment, since license types stored in a database are used, the search range is limited to a finite range, which provides reproducibility of searches. In addition, since the similarities between texts are calculated by a word-by-word comparison, stemming or a thesaurus may be utilized. As a result, negligible differences may be evaluated to be small or may be ignored. In addition, the edit distance used for similarities in a list display is the same as the edit distance used for path determination for a comparison display. Thereby, high ranking in a list matches a large number of matching portions in a comparison. In addition, since a non-matching portion between texts is highlighted in a comparison display, differences are highlighted.

4.4. JP-A-2002-251408

In an information browsing support device in this publication, histories of keywords that have attracted the attention of the user are estimated from the histories of access to Web pages. From the keyword histories, a keyword that is expected to next attract the attention of the user is estimated, and information browsing support is performed for the user. To estimate the keyword, a comparison is made with the past histories of the same user. For the comparison with the past histories, a method of calculating the Levenshtein distance on a per-word basis, not on a per-character basis, and a method of calculating the similarity from the Levenshtein distance are described.

If an individual word is affected by spelling inconsistencies, misspelling, missing characters, false recognition in OCR processing, character garbling, or conjugation of third person singular present tense, the affected individual word, which is regarded as a word different from the individual word, is compared with the individual word. In addition, it is difficult to correct the vagueness on a per-character basis in a word. For example, by applying transformation of "numbers assigned to keywords" to misspelling and missing characters and their candidates, measures may be taken against misspelling and missing characters to some extent. However, words corresponding to a plurality of candidates are present, and therefore an association for obtaining the best comparison result is not established in some cases. For example, the measures are able to handle spelling inconsistencies such as "color" and "colour" or "center" and "centre". If candidates are expanded to the possibilities of misspelling and missing characters, the measures are not able to handle such cases. For example, the measures are not able to handle inconsistencies among "send", "sent", "tent", "end" and "sand" or "sing", "song", "ping", and "pong".

According to the present embodiment, an edit weight is provided for a misspelling correction or replacement by a near-synonym in calculating an edit distance, and therefore the similarities may be calculated in consideration of the vagueness on a per-character basis in a word. For example, by using the Levenshtein distance between words, a misspelling may be determined, which enables words to be compares in consideration of the vagueness on a per-character basis in a word.

Alternatively, a near-synonym may be determined using a database such as a thesaurus, and thereby an association for obtaining the best comparison result may be made even if there is a word corresponding to a plurality of candidates.

4.5. JP-A-2022-93215

This publication discloses a support techniques for use when an English composition of an English-learner. An English composition correction result analysis system of this publication searches for an answer closest to the right answer from an English composition including a wrong answer created by an English-learner. For this purpose, an input English composition including a wrong answer is compared with all the English sentences as right answer candidates prepared in advance, and an association is made to minimize the Levenshtein distance.

If there is a difference in a line break or a white space between two texts, the two texts are displayed as having a difference between the two texts even though the contents of the sentences are equivalent. In addition, the difference is not highlighted. Only the similarities of known techniques are listed, and improvements regarding similarities are not disclosed.

According to the present embodiment, since a word-by-word comparison is performed, the comparison is not affected by differences in a line break and a white space, and thus equivalent sentences may be properly displayed as equivalent sentences. In addition, since a non-matching portion between texts is highlighted in a comparison display, differences are highlighted.

Although the present embodiment has been described above in details, the person skilled in the art would readily understand that many modifications may be made without substantially departing from new matters and effects of the present disclosure. Accordingly, all of such modifications are considered to fall within the scope of the present disclosure. For example, in the specification or the figures, the terms used at least once together with different broader or synonymous terms may be replaced with the different terms in any part of the specification or the figures. In addition, all combinations of the present embodiment and modifications are included in the scope of the present disclosure. In addition, the configurations of the sentence management system, the processing content performed by the sentence management system, the processing content performed by a computer when the sentence management program is executed by the computer, and so on are not limited to those described in the present embodiment, and various modifications may be carried out. For example, in the sentence management system, a plurality of components may be combined together, and a single component may be implemented by a plurality of devices cooperating with each other. In addition, the sentence distance may be calculated in various ways. That is, the sentence distance is not limited to the sentence distance computed by the method described above. In addition, the present disclosure may be understood as a sentence management system, a storage medium storing a sentence management program, a sentence management device, and a sentence management method.

What is claimed is:

1. A sentence management system comprising:

an obtainer configured to obtain a sentence of interest and a plurality of comparison sentences;

a distance calculator configured to calculate a first sentence distance between the sentence of interest and each of the plurality of comparison sentences; and a display processor configured to cause the sentence of interest, the plurality of comparison sentences, and a list of comparison sentence names arranged in order of the first sentence distance to be displayed simultaneously, wherein the distance calculator is further configured to calculate the first sentence distance by calculating a number of edits on a per-word basis between the sentence of interest and the each of the plurality of comparison sentences, and the display processor is further configured to cause a location of an edit between the sentence of interest and a comparison sentence of the plurality of comparison sentences to be displayed in a manner in accordance with the first sentence distance.

2. The sentence management system according to claim 1, wherein the distance calculator is further configured to calculate the first sentence distance by performing an addition using an edit weight in accordance with an edition type to the number of edits.

3. The sentence management system according to claim 2, further comprising:

a weight acceptor configured to accept a setting of the edit weight from a user.

4. The sentence management system according to claim 1, wherein the obtainer is configured to further obtain a second sentence distance between the plurality of comparison sentences, and the distance calculator is further configured to, by using triangle inequality, avoid calculating the first sentence distance between the sentence of interest and a specific comparison sentence of the plurality of comparison sentences between which the first sentence distance is large.

5. The sentence management system according to claim 2, wherein the edit weight for an edit of replacement with a non-synonym is greater than for an edit of replacement with a quasi-synonym included in a quasi-synonym database.

6. The sentence management system according to claim 1, wherein the edit includes insertion, deletion, and replacement of a word.

7. The sentence management system according to claim 6, wherein the edit further includes at least one of a misspelling of the word and a mistake of the word.

8. The sentence management system according to claim 1, wherein the display processor is further configured to cause the location of the edit to be displayed by emphasizing a non-matching word between the sentence of interest and the comparison sentence.

9. A non-transitory computer-readable storage medium storing a sentence management program that causes a computer to execute:

obtaining a sentence of interest and a plurality of comparison sentences;

calculating a first sentence distance between the sentence of interest and each of the plurality of comparison sentences by calculating a number of edits on a per-word basis between the sentence of interest and the each of the plurality of comparison sentences; and causing a location of an edit between the sentence of interest and a comparison sentence of the plurality of comparison sentences to be displayed in a manner in accordance with the first sentence distance.

* * * * *